US010104326B2

(12) United States Patent
Hashimoto et al.

(10) Patent No.: US 10,104,326 B2
(45) Date of Patent: *Oct. 16, 2018

(54) IMAGING APPARATUS INCLUDING ANALOG-TO-DIGITAL CONVERSION CIRCUITS TO CONVERT ANALOG SIGNALS INTO DIGITAL SIGNALS, IMAGING SYSTEM INCLUDING ANALOG-TO-DIGITAL CONVERSION CIRCUITS TO CONVERT ANALOG SIGNALS INTO DIGITAL SIGNALS, AND IMAGING APPARATUS DRIVING METHOD

(71) Applicant: CANON KABUSHIKI KAISHA, Tokyo (JP)

(72) Inventors: Seiji Hashimoto, Yokohama (JP); Takeru Suzuki, Kawasaki (JP); Daisuke Yoshida, Ebina (JP); Atsushi Furubayashi, Inagi (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/397,472

(22) Filed: Jan. 3, 2017

(65) Prior Publication Data
US 2017/0118432 A1    Apr. 27, 2017

Related U.S. Application Data

(63) Continuation of application No. 13/779,653, filed on Feb. 27, 2013, now Pat. No. 9,571,758.

(30) Foreign Application Priority Data

Mar. 1, 2012   (JP) ................................. 2012-045654
Jan. 8, 2013   (JP) ................................. 2013-001083

(51) Int. Cl.
| H04N 3/14 | (2006.01) |
|---|---|
| H04N 5/335 | (2011.01) |
| H04N 5/378 | (2011.01) |
| H04N 5/376 | (2011.01) |
| H04N 5/341 | (2011.01) |

(52) U.S. Cl.
CPC ............ H04N 5/378 (2013.01); H04N 5/341 (2013.01); H04N 5/3765 (2013.01)

(58) Field of Classification Search
CPC .................... H04N 5/23229; H04N 5/3355
USPC ............................................ 348/294, 300
See application file for complete search history.

(56) References Cited

U.S. PATENT DOCUMENTS 5,687,003 A *  11/1997  Nagano ................... H04N 1/40
                                                358/445
6,750,437 B2 *  6/2004  Yamashita ......... H04N 5/23212
                                                250/208.1
2011/0155890 A1 *  6/2011  Egawa ................. H04N 5/3575
                                                250/208.1

(Continued)

*Primary Examiner* — Antoinette Spinks
(74) *Attorney, Agent, or Firm* — Canon U.S.A., Inc. IP Division

(57) ABSTRACT

An imaging apparatus, driving method of the imaging apparatus, and an imaging system, are provided, wherein pixels output at least two image signals with different viable signal ranges, and the pixel signal with a larger signal range is converted to a digital signal during a first period, and the pixel signal with a smaller signal range is converted to a digital signal during a second period shorter than the first period.

19 Claims, 24 Drawing Sheets

(56) References Cited

U.S. PATENT DOCUMENTS

2012/0229669 A1* 9/2012 Okada .................... H04N 5/347
    348/222.1
2013/0107087 A1* 5/2013 Okada .................... H04N 5/365
    348/280

* cited by examiner

IMAGING APPARATUS INCLUDING ANALOG-TO-DIGITAL CONVERSION CIRCUITS TO CONVERT ANALOG SIGNALS INTO DIGITAL SIGNALS, IMAGING SYSTEM INCLUDING ANALOG-TO-DIGITAL CONVERSION CIRCUITS TO CONVERT ANALOG SIGNALS INTO DIGITAL SIGNALS, AND IMAGING APPARATUS DRIVING METHOD

RELATED APPLICATIONS

This application is a Continuation of U.S. patent application Ser. No. 13/779,653 filed on Feb. 27, 2013, which claims the benefit of Japanese Application No. 2012-045654 filed Mar. 1, 2012, and Japanese Application No. 2013-001083 filed Jan. 8, 2013, which are hereby incorporated by reference herein in their entirety.

BACKGROUND OF THE INVENTION

Field of the Invention

The present technology relates to an imaging system and an imaging apparatus including analog-to-digital conversion circuits to convert analog signals into digital signals.

Description of the Related Art

According to the related art, an imaging apparatus is known to include pixels that are arranged in a matrix, perform photoelectric conversion, and output signals based on incident light, and to include column-parallel analog-to-digital circuits (hereafter, analog-to-digital circuit is referred to as an ADC (Analog Digital Converter), and the column-parallel ADC is referred to as the column ADC), which are provisioned in each pixel column, that perform AD conversion on the signal output from the pixels. A circuit unit in each column in the column ADC performs analog-to-digital conversion (hereafter, referred to as AD conversion) to convert the analog signals output from the pixels (hereafter, the "analog signal output from the pixels" is referred to as pixel signal) into digital signals.

Also, Japanese Patent Laid-Open No. 2004-134867 discloses an imaging apparatus including pixels that output a first pixel signal based on a first signal charge accumulated in at least one photoelectric conversion unit, and a second pixel signal based on a signal charge calculated from the first signal charge and a signal charge accumulated in another photoelectric conversion unit. According to this imaging apparatus, the viable signal range of signal values for the first pixel signal is narrower than the viable signal range of signal values for the second pixel signal.

Japanese Patent Laid-Open No. 2000-59687 discloses an imaging apparatus that includes pixels which include multiple photoelectric conversion units with different surface areas. When the same amount of light is illuminated on the multiple photoelectric conversion units, the photoelectric conversion units with larger surface areas produce larger signal charges as compared to the photoelectric conversion units with smaller surface areas. Thus, the viable signal range for pixel signals based on photoelectric conversion units with smaller surface areas is narrower than the viable signal range for pixel signals based on photoelectric conversion unit with larger surface areas.

SUMMARY OF THE INVENTION

According to the related art, when converting at least two photoelectric conversion signals with different viable signal ranges, enough consideration has not been given to the balance between the accuracy of converting the pixel signals to digital signals and shortening the time used to perform the conversion. An embodiment is an imaging apparatus comprising a pixel including a plurality of photoelectric conversion units configured to generate signal charge and to output a signal based on the signal charge, and an AD conversion unit configured to convert the signal output from the pixel into a digital signal, wherein compared to a first conversion period in which a signal based on the signal charges from m (m being an integer) of the photoelectric conversion units included in the pixel into a digital signal, a signal based on the signal charges from n (n being an integer smaller than m) of the photoelectric conversion units included in the pixel is converted into a digital signal in a second conversion period shorter than the first conversion period.

According to the present technology, when converting at least two photoelectric conversion signals with different viable signal ranges, balance between the accuracy of converting the pixel signals to digital signals and shortening the time used to perform the conversion has been achieved.

Further features of the present disclosure will become apparent from the following description of exemplary embodiments with reference to the attached drawings.

DESCRIPTION OF THE EMBODIMENTS

First Embodiment

Figure 1:
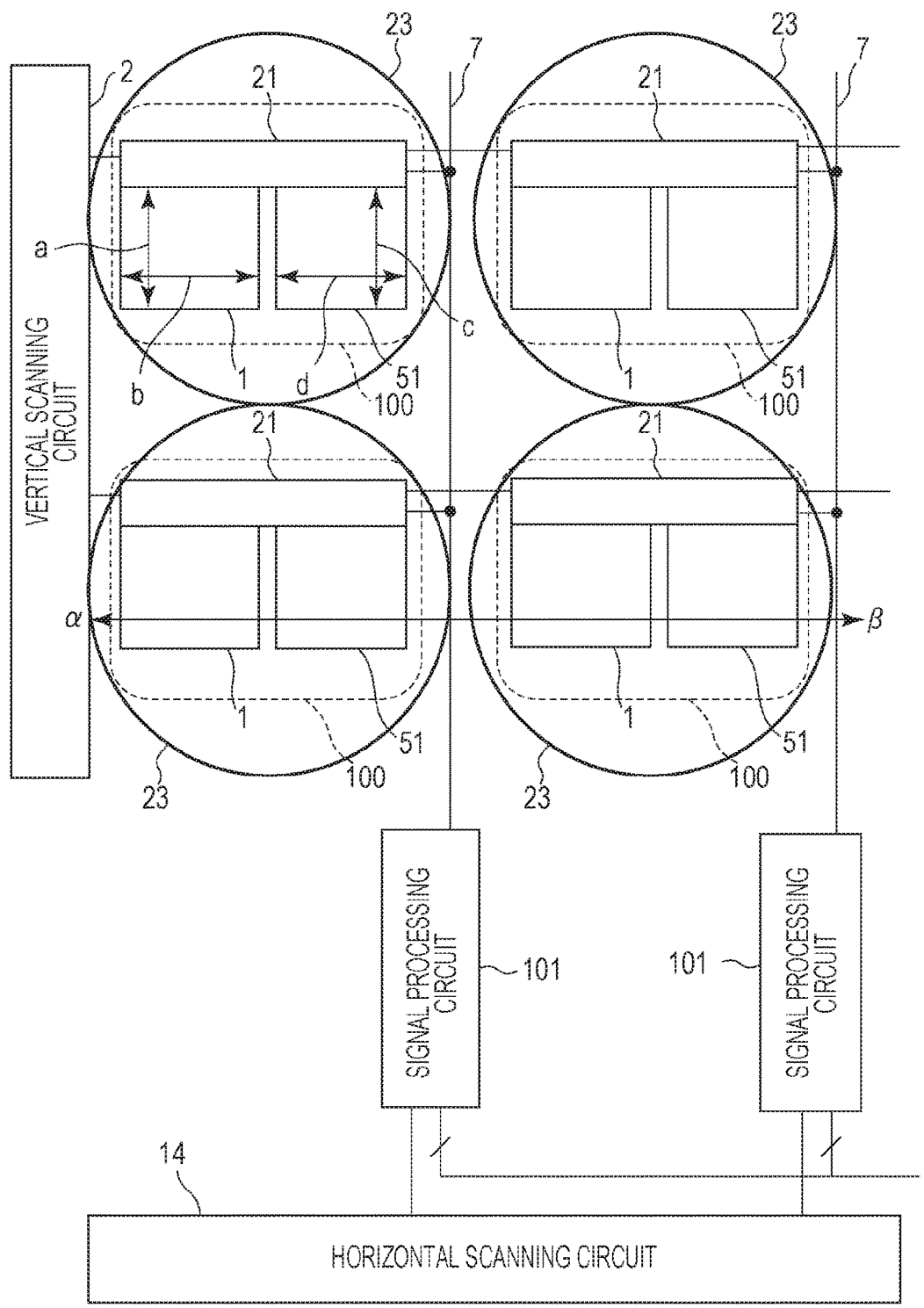
FIG. 1 is an overhead view and an equivalent circuit diagram of an imaging apparatus.

An imaging apparatus according to the present embodiment will be described below with reference to the diagrams. FIG. 1 is a diagram illustrating an overview of the imaging apparatus according to the present embodiment, and an example schematic diagram of a circuit configuration that reads out signals from pixels. Reference numeral 1 denotes a first photodiode which is a first photoelectric conversion unit, 51 denotes a second photodiode which is a second photoelectric conversion unit, and 21 denotes an intra-pixel readout circuit unit that is electrically connected to the photodiodes 1 and 51. Reference numeral 100 denotes pixels which are configured of the multiple photodiodes 1 and 51, and the intra-pixel readout circuit unit 21. The intra-pixel readout circuit unit 21 is configured with transfer MOS transistors 20 and 50, a reset MOS transistor 4, an amplifier MOS transistor 5, and a selection MOS transistor 6. The pixel 100 is arranged over multiple rows and multiple columns. That is to say, the pixels 100 are arranged as a matrix. The area where the pixels 100 are in this matrix is referred to as a pixel unit. One pixel 100 which includes photodiodes 1 and 51 will collectively be referred to as a light-receiving unit. Reference numeral 23 denotes a microlens which directs incident light to the light-receiving unit. One microlens is allocated so as to cover one light-receiving unit. Thus, one microlens is provided for each light-receiving unit. Also, microlenses cover the multiple photoelectric conversion units included in the corresponding pixel 100, and also direct illuminated light to the multiple photoelectric conversion units included in the corresponding pixel 100. The imaging apparatus according to the present embodiment includes a microlens array with multiple microlenses. A surface area of the photodiode is, for example, the surface area of photodiode 1 illustrated in FIG. 1 as a×b. This is the same for photodiode 51, illustrated in FIG. 1 as c×d. Also, the area with the surface area expressed as a×b is the light-receiving area of the photodiode 1. Similarly, the area with the surface area expressed as c×d is the light-receiving area of the photodiode 51.

Reference numeral 2 denotes a vertical scanning circuit which consecutively scans the pixels 100 by each row. The vertical scanning circuit 2 outputs the pixel signals from the pixels 100 belonging to the selected row to a vertical signal line 7. The vertical signal line 7 transfers the pixel signals output from the pixel 100 to a signal processing circuit 101. The signal processing circuit 101 is a circuit that processes pixel signals output from the pixels 100. Reference numeral 14 denotes a horizontal scanning circuit which sequentially scans the signal processing circuits 101 for each column. In FIG. 1, the photodiodes 1 and 51 in the pixels 100 are arranged in juxtaposition along a direction that lines up with the vertical processing circuit 101 for each column. That is to say, two columns of photodiodes 1 and 51 are arranged within the pixel 100.

Figure 2:
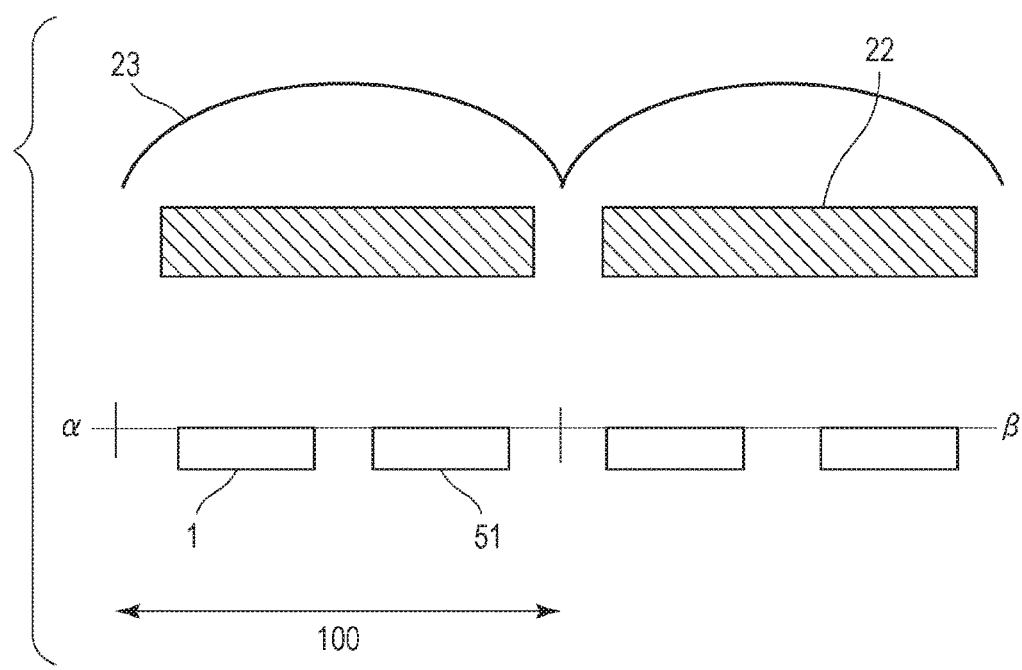
FIG. 2 is a cross-sectional diagram of the imaging apparatus.

Next, FIG. 2 illustrates a cross section of a portion of one pixel 100 illustrated in FIG. 1 along the line α-β. Reference numeral 22 denotes a color filter which transmits light for a particular wavelength band. The color filter 22 is provisioned between the microlens 23 and the photodiodes 1 and 51.

The pixels provisioned in the imaging apparatus in the present embodiment output signals which form the basis of a focal-point detection signal for focal-point detection according to the phase difference detecting method, and signals which form the basis of an image obtaining signal for imaging. For example, signals that form the basis of focal-point detection signals may be output from multiple pixels arranged in a line state or a crossed state. The imaging apparatus processes the signals that form the basis of focal-point detection signals and signals that form the basis of image obtaining signals output from the pixels and outputs the focal-point detection signals and the image obtaining signals. Based on the focal-point detection signals output from the imaging apparatus, the mutual phase difference of the illuminated light may be detected. Thus, based on this detected phase difference, the focal-point detection may be performed.

Figure 3:
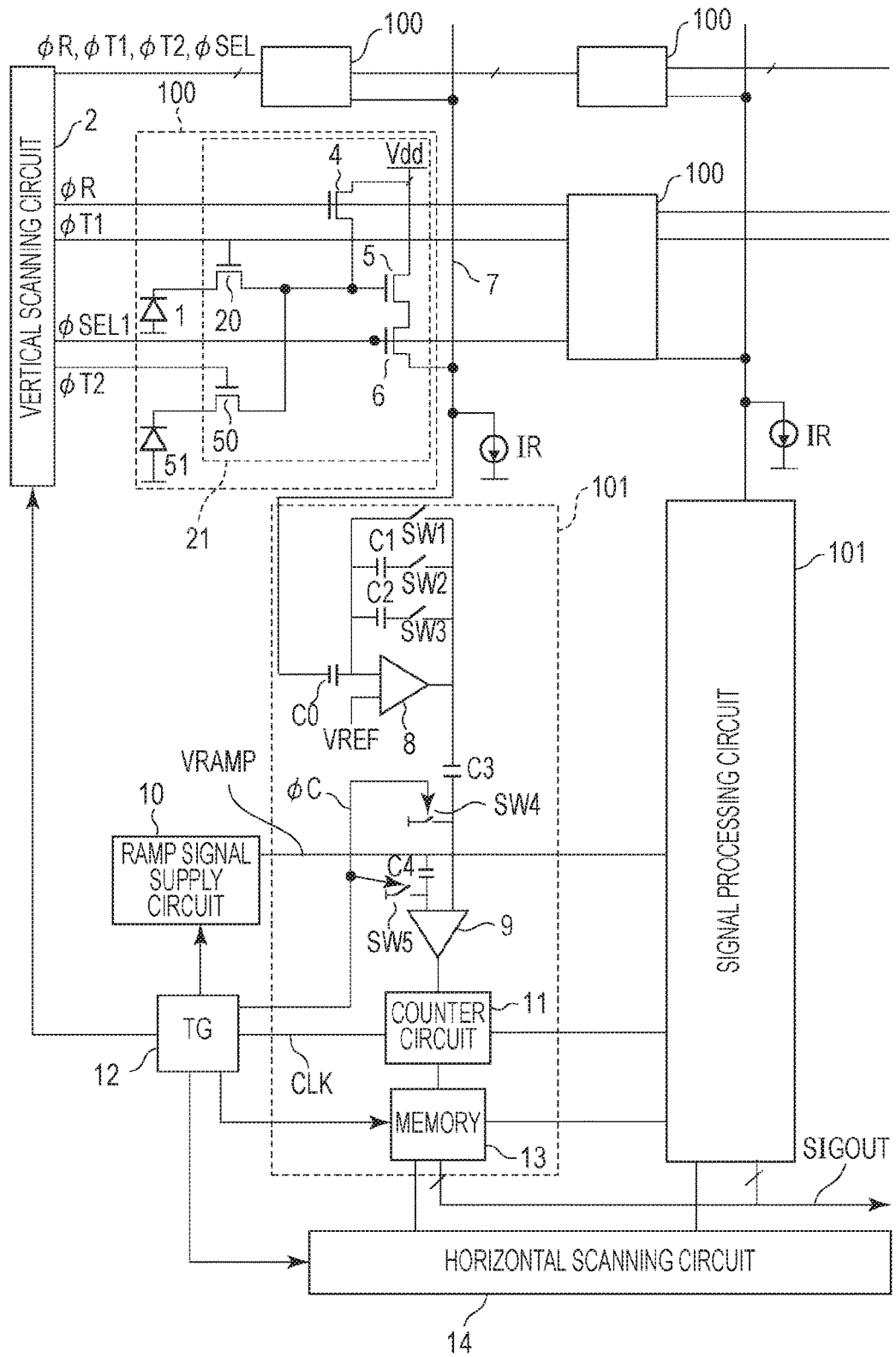
FIG. 3 is equivalent circuit diagram of the imaging apparatus.

FIG. 3 is a block diagram illustrating a schematic of the pixel 100 in the second row, second column, and the signal processing circuit 101 in the second column, which are portions of the imaging apparatus in the present embodiment.

First, the pixels 100 will be described. Reference numerals 20 and 50 denote transfer MOS transistors, reference numeral 4 denotes a reset MOS transistor, reference numeral 5 denotes an amplifier MOS transistor, and reference numeral 6 denotes a selection MOS transistor. When light is illuminated onto photodiodes 1 and 51, a signal charge is generated by photoelectric conversion. The transfer MOS transistor 20 is electrically connected to the photodiode 1 and an input node of the amplifier MOS transistor 5. The transfer MOS transistor 50 is also electrically connected to the photodiode 51 and an input node of the amplifier MOS transistor 5. When a transfer pulse φT1 to be supplied to a gate of the transfer MOS transistor 20 from the later-described vertical scanning circuit is at a high level (Hereafter, referred to as H level. Similarly, low level will be referred to as L level), the signal charge from the photodiode 1 is transferred to the input node of the amplifier MOS transistor 5. Similarly, when a transfer pulse φT2 to be supplied to a gate of the transfer MOS transistor 50 from a second vertical scanning circuit is at H level, the signal charge from the photodiode 51 is transferred to the input node of the amplifier MOS transistor 5. When a reset pulse φR that the vertical scanning circuit 2 supplies to the input node of the amplifier MOS transistor 5 is changed to H level, the potential of the input node of the amplifier MOS transistor 5 is reset. The amplifier MOS transistor 5 is electrically connected to the selection MOS transistor 6. The amplifier MOS transistor 5 outputs an electrical signal to the selection transistor 6, based on the signal charge in the input node of the amplifier MOS transistor 5. The selection MOS transistor 6 is electrically connected to a vertical signal line 7, and the signal output from the amplifier MOS transistor 5 is output to the vertical signal line 7 at a time when a selection pulse φSEL1 supplied from the second vertical scanning circuit 2 is at H level. The signal output from the vertical signal line 7 is referred to as signal A, based on the potential of the input node of the amplifier MOS transistor 5, where the signal charge from the photodiode 1 has been transferred. Also, the signal output from the vertical signal line 7 is referred to as signal B, based on the potential of the input node of the amplifier MOS transistor 5, where the signal charge from the photodiode 51 has been transferred. Signal A and signal B are the signals that form the basis of the focal-point detection signals used for focal-point detection. According to the present embodiment, signal A is a second photoelectric conversion signal (signal A+B denotes a first photoelectric conversion signal, described later). Also, the signal charge accumulated in both the photodiodes 1 and 51 may be transferred to the input node of the amplifier MOS transistor 5 by setting both transfer pulses φT1 and φT2 at H level. The signal output to the vertical signal line 7, based on the potential of the input node of the amplifier MOS transistor 5 at this time, is referred to as the signal A+B. The signal A+B forms the basis of the image obtaining signal, and is the first photoelectric conversion signal. According to the present embodiment, signal B, or the signal output to the vertical signal line 7 by the transfer of only the signal charge held after photoelectric conversion at the photodiode 51 to the input node of the amplifier MOS transistor 5, is not generated by an output operation from the pixel 100. The signal equivalent to signal B is obtained by difference processing of the image obtaining signal and the focal-point detection signal being performed by a digital signal processing circuit, which will be described later.

According to the present embodiment, correlated double sampling (hereafter, referred to as CDS) is performed, which will be described later. That is to say, three signals are output from the pixel 100, a signal N, which is a signal output from the amplifier MOS transistor 5 via the selection MOS transistor 6 when the potential of the input node of the amplifier MOS transistor 5 is at a reset level, and the previously described signal A and signal A+B. According to the present embodiment, the pixel signals are the collective signals which include the signal N, signal A, and signal A+B output from the pixel 100 to the vertical signal line 7. Also, the signal A and signal A+B are the photoelectric conversion signals based on the signal charge generated by light illuminated from the light-receiving unit. Also, the signal N is a noise signal which includes noise components from the pixel 100.

The pixels 100 have been previously described. Reference numeral C0 denotes a clamp capacitor. Reference numeral 8 denotes an operational amplifier, which amplifies and outputs the pixel signal output from the pixel 100 through the clamp capacitor C0. Feedback capacitors C1 and C2, as well as switches SW2 and SW3 are provisioned on the feedback path of the operational amplifier 8. A reverse gain is generated in an output terminal of the operational amplifier 8 by the capacitance ratio of the clamp capacitor C0 and the CF_total, which is the total capacitance value of the feedback capacitor from among the feedback capacitors C1 and C2, at an electroconductive state corresponding to the output terminal and input terminal of the operational amplifier 8. The amplifier unit is configured with the operational amplifier 8, the feedback capacitors C1 and C2, and the switches SW2 and SW3, and a switch SW1.

The signal output from the operational amplifier 8 is input to a comparator 9 via the clamp capacitor C3. A ramp signal VRAMP, whose potential is changed depending on time, is supplied to the comparator 9 from a ramp signal supply circuit 10 via a clamp capacitor C4. The comparator 9 performs a comparison of the ramp signal VRAMP and the signal output from the operational amplifier 8 via the clamp capacitor C3, which based on the comparison result produces a latch signal LAT that is output to a counter circuit 11. Thus, when the magnitude relationship between the ramp signal VRAMP and the signal output from the operational amplifier 8 is reversed, the signal level of the latch signal LAT output from the comparator 9 is changed. The latch signal LAT is the comparison result signal based on the result of the comparison between the signal input from the operational amplifier 8 and the ramp signal VRAMP whose potential changes depending on time. A clock pulse signal CLK is output to the counter circuit 11 from a TG 12. The counter circuit 11 generates a count signal by counting the clock pulse signal CLK during the period from when the ramp signal supply circuit 10 starts changing the potential of the ramp signal VRAMP, dependent on time, to the time when the latch signal LAT is changed by the comparator 9. At the time when the latch signal LAT output from the comparator 9 changed, the counting of the clock pulse signal CLK terminates, and also the count signal at the time the latch signal LAT changed is held. When the period wherein the ramp signal VRAMP changes terminates, memory 13, which is a signal holding unit, inputs the count signal held at the counter circuit 11 and holds the count signal. According to the present embodiment, an analog-to-digital conversion unit includes the comparator 9, the ramp signal supply circuit 10, the counter circuit 11, and the memory 13. A horizontal scanning circuit 14 consecutively selects the memory 13 in each column, based on the timing from the TG 12, and transfers the count signal held at the memory 13 in each column. The signal output by this horizontal scanning circuit 14 is an output signal SIGOUT output from the imaging apparatus. The output signal SIGOUT according to the present embodiment is the digital signal N, digital signal A, and the digital signal A+B, all of which are described later. That is to say, the output signal SIGOUT is a signal based on the pixel signals. Also, the digital signal A is a focal-point detection signal, and the digital signal A+B is an image obtaining signal. Also, the ramp signal VRAMP is the reference signal according to the present embodiment. Also, the ramp signal supply circuit 10 is the reference signal supply unit that supplies the reference signal, whose potential changes depending on time, to the comparator. The digital signal A is the first digital signal, the digital signal A+B is the second digital signal, and the digital signal N is the third digital signal.

Figure 4:
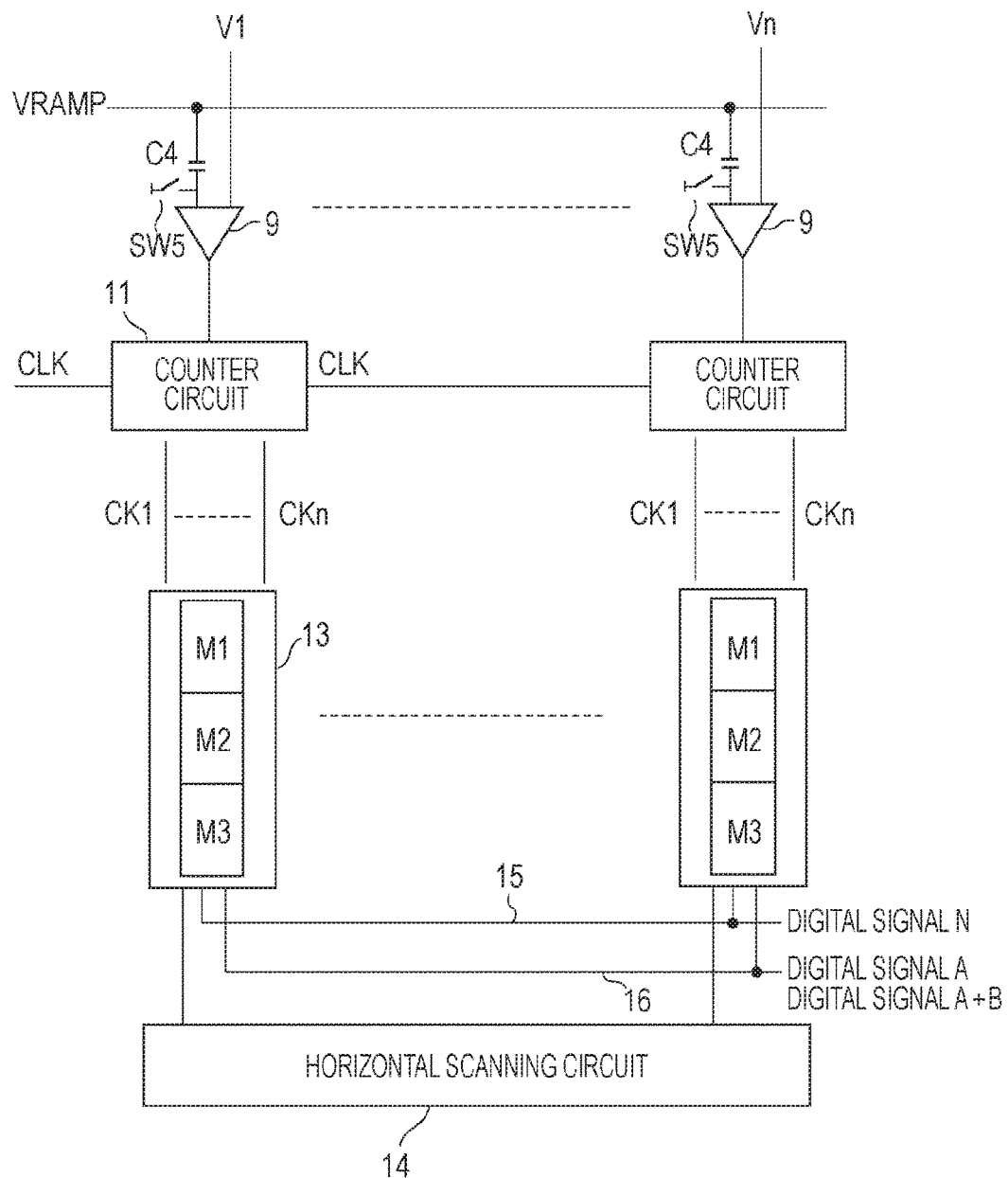
FIG. 4 is a diagram illustrating an example of a configuration of a counter circuit and a memory.

Next, FIG. 4 illustrates an example configuration of an analog-to-digital conversion unit that includes the counter circuit 11 and the memory 13. The counter circuit 11 generates an n-bit count clock signal CKn, based on the clock pulse signal CLK supplied from the TG 12, and outputs this to the memory 13. An n number of count signal transfer lines to transfer the n-bit count signal are provisioned between the counter circuit 11 and the memory 13. According to the present embodiment, the pixel 100 of the imaging apparatus outputs three signals, signal N, the signal A, and the signal A+B. According to the present embodiment, the signal N, the signal A, and the signal A+B are analog signals wherein an operation to convert each of these signals into digital signals is performed whenever they are output from the pixel 100. For this reason, three memory units to hold these three different digital signals are provisioned in the memory 13. Specifically, a memory unit M1 holds the digital signal N based on the signal N, a memory unit M2 holds the digital signal A based on the signal A, and a memory unit M3 holds the signal A+B based on the signal A+B. A signal line N 15 and a signal line S 16 are electrically connected in the memory 13, and so the digital signal N is output from the memory unit M1 to the signal line N 15, and the digital signal A and the digital signal A+B based on the A+B signal are output by time division from the memory units M2 and M3 respectively to the digital line S 16.

Figure 5:
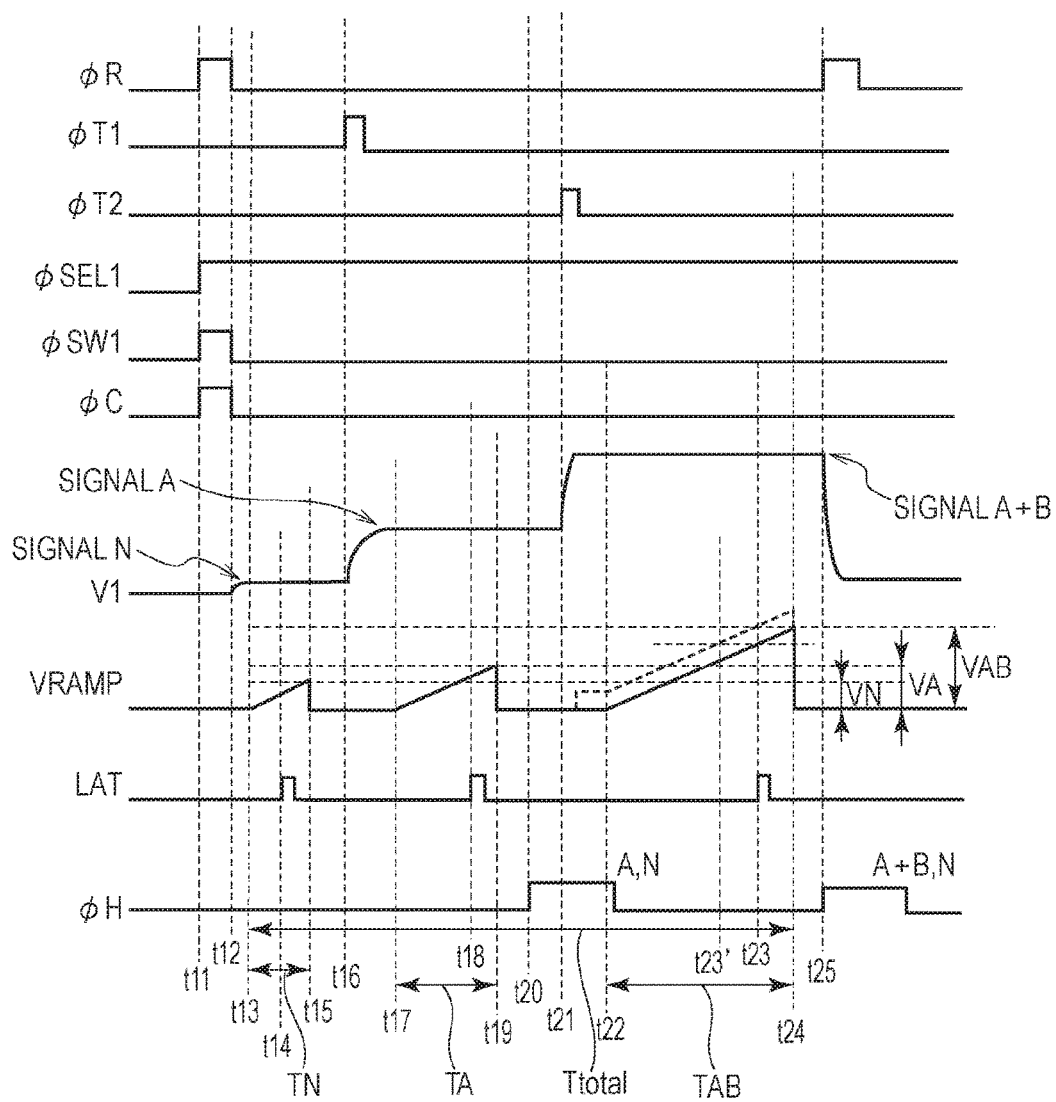
FIG. 5 is a diagram illustrating operation timing of the imaging apparatus.

Next, FIG. 5 illustrates an example operation timing for the imaging apparatus in the present embodiment. A switch pulse φSW1 is a pulse that turns the switch SW1 on and off, and so the switch SW1 is on when this pulse is at H level. Reference numeral V1 denotes the output from the operational amplifier 8. Reference numeral φH denotes a horizontal selection signal from the horizontal scanning circuit 14 that causes the count signal held at the memory 13 to be output from the memory 13. For the following description, at least one of a φSW2 and a φSW3 is at H level, which is to say the signals are amplified by the ratio with the capacitance value of the clamp capacitor C0.

At point-in-time t11, a reset pulse φR changes to H level, and this sets the potential of the input node of the amplifier MOS transistor 5 to the reset level. Also, a selection pulse φSEL1 changes to H level. This causes the pixel signal at the time when the potential of the input node of the amplifier MOS transistor 5 is at the reset level to be output from the pixel 100 to the vertical signal line 7. A switch pulse φC changes to H level, and this turns on a switch SW4 and a switch SW5. The switch SW5 is turned on when the switch pulse φC is at a high level, and so the charge held in the clamp capacitor C4 is reset. The switch pulse φSW1 changes to H level, which causes a short between the output terminal and the input terminal of the operational amplifier 8, which in turn causes the charge held at the clamp capacitor C0 and C3 to be reset.

At point-in-time t12, the reset pulse φR, the switch pulses φSW1 and φC change to L level. When the switch pulses φSW1 and φC change to L level, the potential of the clamp capacitors C0, C3, and C4 are held. When the reset pulse φR changes from H level to L level, the potential of the input node of the amplifier MOS transistor 5 is changed by a charge injection generated by the reset MOS transistor 4. As a result, the signal level of the pixel signal output from the vertical signal line 7 is also changed. The pixel signal output at the point-in-time t12 is denoted as the signal N for the following description. The signal N is the signal based on the signal charge when the photodiodes 1 and 51 are dark. Similarly, the pixel signal output to the vertical signal line 7 based on the potential of the input node of the amplifier MOS transistor 5 that is holding the signal charge generated when the light-receiving unit performs photoelectric conversion of incident light is denoted as the signal S. The operational amplifier 8 amplifies the signal supplied via the clamp capacitor C0 and then outputs this to the clamp capacitor C3. The signal supplied to the clamp capacitor C3 is the amplified signal output from the pixel 100 via the clamp capacitor C0 superimposed with an offset signal Voff from the operational amplifier 8. The signal output from the operational amplifier 8 is then supplied to the comparator 9 via the clamp capacitor C3.

At point-in-time t13, the ramp signal supply circuit 10 starts changing the ramp signal VRAMP. The comparator 9 starts the comparison operation on the signal output from the operational amplifier 8 via the clamp capacitor C3 and the ramp signal VRAMP supplied from the ramp signal supply circuit 10. Also, the counter circuit 11 starts counting of the clock pulse signal CLK at point-in-time t13 as the ramp signal supply circuit 10 starts changing the ramp signal VRAMP, and then outputs the counting result signal to the memory 13.

At point-in-time t14, for example, the magnitude relationship between the signal output from the operational amplifier 8 via the clamp capacitor C3 and the ramp signal VRAMP is reversed. In response to this, the comparator 9 outputs the latch signal LAT. The circuit 11 to which this latch signal LAT has been output terminates the output of the count signal to the memory 13. The memory 13 holds the count signal at its current state at the point-in-time t14. At point-in-time t15, the ramp signal supply circuit 10 stops changing the ramp signal VRAMP. The width of the potential change of this ramp signal VRAMP during the period of point-in-time t13 through t15, which is denoted as period TN, is denoted as VN. Compared to the conversion of the signal S to a digital signal, which will be discussed later, the time to change the ramp signal VRAMP when converting this signal N to a digital signal is shortened, and additionally the changing potential range VN is also smaller than a potential range VA, also discussed later. Generally, this is due to the fact that the signal N is mainly noise components and offset components, and so the signal range of the signal N is narrower than the signal range of the signal S. As a result, the time for the conversion operation of the pixel signal output from the pixel in the first row may be shortened.

The operations performed by the comparator 9, the counter circuit 11, and the memory 13 during these point-in-time t13 through t15 enable the analog signal output from the operational amplifier 8 via the capacitor C3 to be converted to a digital signal. The operations performed by the comparator 9, the counter circuit 11, and the memory 13 during these point-in-time t13 through t15 are grouped together and referred to as the N conversion in the description below. The digital signal held in the memory 13 as a result of this N conversion is the digital signal N.

At point-in-time t16, the transfer pulse φT1 changes to H level. As a result, the signal charge generated by photoelectric conversion at the photodiode 1 is transferred to the input node of the amplifier MOS transistor 5. Thus, the signal A, which is one portion of the signal S, is output to the vertical signal line 7 (in the present embodiment, the signal S is the output by time division of the signal A and the signal A+B). After the signal A is output from the pixel 100 to the clamp capacitor C0, the transfer pulse φT1 changes to L level. The operational amplifier 8 amplifies the signal A output from the pixel 100 via the clamp capacitor C0, and then outputs this to the comparator 9 via the clamp capacitor C3.

At point-in-time t17, the ramp signal supply circuit 10 starts changing the ramp signal VRAMP. Further, the comparator 9 starts the comparison operation on the signal output from the operational amplifier 8 via the clamp capacitor C3 and the ramp signal VRAMP. Further, similar to the case of the signal N previously described, the counter circuit 11 starts counting of the clock pulse signal CLK at the same time the signal level of the ramp signal VRAMP starts to be changed.

At point-in-time t18, for example, the magnitude relationship between the signal A output from the operational amplifier 8 via the clamp capacitor C3 and the ramp signal VRAMP is reversed. In response to this, the comparator 9 outputs the latch signal LAT to the counter circuit 11. The counter circuit 11 to which this latch signal LAT has been output terminates the output of the count signal to the memory 13. The memory 13 holds the count signal at its current state at the point-in-time t18. At point-in-time t19, the ramp signal supply circuit 10 stops changing the ramp signal VRAMP. The width of the potential change of this ramp signal VRAMP during the period of point-in-time t17 through t19, which is denoted as period TA, is denoted as VA. The period VA in which the ramp signal VRAMP is changed for the conversion of signal A is shorter than a period VAB in which the ramp signal VRAMP is changed for the conversion of the signal A+B, which will be discussed later. The potential width VA in which the ramp signal VRAMP changes is also smaller than a potential width VAB in which the ramp signal VRAMP changes for the conversion of the signal A+B. This is due to the fact that the viable signal amplitude of signal A is smaller as compared to the viable signal amplitude of the signal A+B. The period TA denotes the first AD conversion period.

The operations performed by the comparator 9, the counter circuit 11, and the memory 13 during these point-in-time t17 through t19 enable the analog signal output from the operational amplifier 8 via the capacitor C3 to be converted to a digital signal. The operations performed by the comparator 9, the counter circuit 11, and the memory 13 during these point-in-time t17 through t19 are grouped together and referred to as the A conversion in the description below. The digital signal held in the memory 13 as a result of this A conversion is the digital signal A.

Next, at point-in-time t20, the horizontal selection signal ϕH changes to H level, and the digital signal N in the signal line N 15 and the digital signal A in the signal line S 16 are transferred from the memory 13 to a device external to the imaging apparatus. The device external to the imaging apparatus may be, for example, a digital signal processing circuit, which will be described later. According to the present embodiment, setting of the horizontal selection signal ϕH to H level is performed at the point-in-time t20, and the transfer pulse ϕT2 is set at point-in-time t21, but the order of these two operations may be reversed. It is preferable if the transfer of the digital signal A and the digital signal N is finished by point-in-time t24, which ends the A+B conversion, discussed later. As a result, the transfer of the digital signal A+B, discussed later, and the digital signal N may occur as soon as the A+B conversion finishes.

Next, at the point-in-time t21, the transfer pulse ϕT2 changes to H level. As a result, the signal charge generated by photoelectric conversion at the photodiode 51 is transferred to the input node of the amplifier MOS transistor 5. The signal charge from the photodiode 1 is already being held at the input node of the amplifier MOS transistor 5. Therefore, by setting the transfer pulse ϕT2 to H level, the signal charge from both the photodiodes 1 and 51 are held in an FD area. The signal based on the potential of the input node of the amplifier MOS transistor 5 to which the signal charge from both of these photodiodes 1 and 51 has been transferred, that is to say, the signal A+B, is output to the vertical signal line 7. Therefore, the operational amplifier 8 amplifies the signal A+B output from the pixel 100 via the clamp capacitor C0, and outputs this to the comparator 9 via the clamp capacitor C3.

At point-in-time t22, the ramp signal supply circuit 10 starts changing the ramp signal VRAMP. Further, the comparator 9 starts the comparison operation on the signal output from the operational amplifier 8 via the clamp capacitor C3 and the ramp signal VRAMP. Further, similar to the case of the signal N previously described, the counter circuit 11 also starts counting of the clock pulse signal CLK at the same time as the signal level of the ramp signal VRAMP starts to be changed.

At point-in-time t23, for example, the magnitude relationship between the signal output from the operational amplifier 8 via the clamp capacitor C3 and the ramp signal VRAMP is reversed. In response to this, the latch signal LAT output from the comparator 9 outputs to the counter circuit 11 is changed in its signal level. The counter circuit 11 to which this latch signal LAT has been output terminates the output of the count signal to the memory 13. The memory 13 holds the count signal at its current state at the point-in-time t23. At point-in-time t24, the ramp signal supply circuit 10 stops changing the ramp signal VRAMP. The width of the potential change of this ramp signal VRAMP during the period of point-in-time t22 through t24, which is denoted as period TAB, is denoted as VAB. As previously described, the period VA in which the ramp signal VRAMP is changed for the conversion of signal A is shorter than the period VAB in which the ramp signal VRAMP is changed for the conversion of the signal A+B. The potential width VA in which the ramp signal VRAMP changes is also narrower than the potential width VAB in which the ramp signal VRAMP changes for the conversion of the signal A+B. This is due to the fact that the viable signal amplitude of signal A is narrower as compared to the viable signal amplitude of the signal A+B. The period TAB denotes the second AD conversion period.

The operations performed by the comparator 9, the counter circuit 11, and the memory 13 during these point-in-time t22 through t24 enable the analog signal output from the operational amplifier 8 via the capacitor C3 to be converted to a digital signal. The operations performed by the comparator 9, the counter circuit 11, and the memory 13 during these point-in-time t22 through t24 are grouped together and referred to as the A+B conversion in the description below. The digital signal held in the memory 13 as a result of this A+B conversion is the digital signal A+B.

Figure 13:
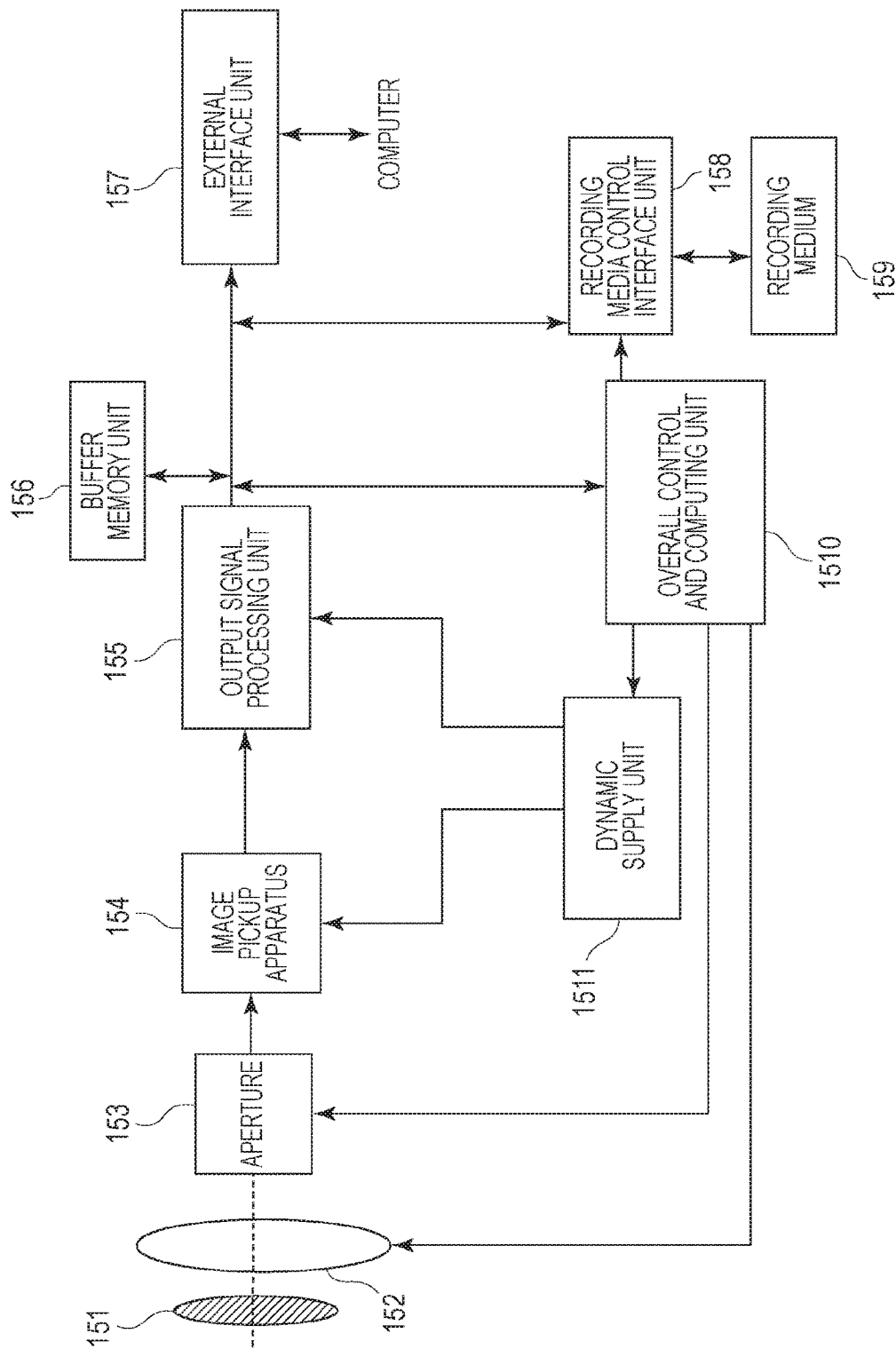
FIG. 13 is a schematic diagram of an imaging system.

Next, at point-in-time t25, the horizontal selection signal ϕH changes to H level, and the digital signal N in the signal line N 15 and the digital signal A+B obtained by the A+B conversion in the signal line S 16 are transferred from the memory 13 to a device external to the imaging apparatus. The device external to the imaging apparatus may be, for example, a digital signal processing circuit, such as the example of an output signal processing unit 155 of the imaging system as illustrated in FIG. 13. This digital signal processing circuit performs processing to obtain the difference between the digital signal A and the digital signal N and the difference between the digital signal A+B and the digital signal N, processing to calculate the difference between the digital signal A+B and the digital signal A to obtain the digital signal B, or the like. The digital signal B is a digital signal that is not based on the result of the signal charge from the photodiodes 1 and 51 being added at the input node of the amplifier MOS transistor 5, but is based on the signal B output when the signal charge held at the input node of the amplifier MOS transistor 5 is only from the photodiode 51, which is then converted to a digital signal in the same way as with the A conversion. The digital signal B is the difference signal, which is specifically the difference between the digital signal A and the digital signal A+B. The digital signal processing circuit performs focal-point detection by the phase difference detecting method using the digital signal A and the digital signal B. Also, the images may be formed using the digital A+B signal, which is the result of the A+B conversion being performed on the A+B signal output from each pixel. Also, regarding the signal noise level generated from the pixel 100, operational amplifier 8, and other devices where the digital signal A and the digital signal A+B are superimposed, the digital processing circuit removes the digital signal N from the digital signal A and the digital signal A+B to decrease noise.

As previously described, the analog signals of the signal N, signal A, and signal A+B are converted to digital signals. According to the present embodiment, the imaging apparatus compares the first reference signal VRAMP changed by the first range VAB and the signal A+B, which is a photoelectric conversion signal based on the signal charge output from an m number of the photoelectric conversion units included in the pixel 100, during the first period TAB at the comparator 9. Further, the second reference signal VRAMP changed by the second range VA, which is a smaller signal amplitude than the first range, and the signal A, which is a photoelectric conversion signal based on the signal charge output from an n number of the photoelectric conversion units, which is smaller than the m number, included in the pixel 100, during the second period TA, which is shorter than the first period, at the comparator 9.

According to the imaging apparatus of the present embodiment, the period TA in which the ramp signal VRAMP is changed for the A conversion is shorter than the period TAB in which the ramp signal VRAMP is changed for the A+B conversion. As a result, a period Ttotal, which is the time to convert the pixel signals to digital signals, may be shortened as compared to the case when the period TA and the period TAB take the same amount of time.

Also, a signal amplitude VN of the ramp signal VRAMP for the N conversion is smaller than the signal amplitude VA of the ramp signal VRAMP for the A conversion, and the period TN is shorter than the period TA as previously described. By making the period TN shorter than the period TA, the period Ttotal may be shortened as compared to the case when the period TN and the period TA take the same amount of time. Further, a third reference signal is the ramp signal VRAMP whose potential is changed by the signal amplitude VN, which is the third range.

According to the imaging apparatus of the present embodiment, while the inclination of the ramp signal VRAMP (the amount of potential change of the ramp signal VRAMP for some unit of time) is the same for the A conversion and the A+B conversion, the period TA may be made shorter than the period TAB. In such a case, the accuracy of the AD conversion to convert the analog signals to digital signals is not different between the A conversion and the A+B conversion, yet the period Ttotal may be shortened as compared to the case when the period TA and the period TAB take the same amount of time. Also, the inclination of the ramp signal VRAMP for the N conversion may also be made the same as the A conversion and the A+B conversion. Also in such a case, the accuracy of the AD conversion to convert the analog signals to digital signals is not different between the N conversion, A conversion, and the A+B conversion, yet the period Ttotal may be shortened as compared to the case when the period TN and the period TA take the same amount of time.

According to the imaging apparatus of the present embodiment, the signal value of the signal A+B is the same or higher than the signal A. Therefore, it is more readily permissible to lower the AD conversion accuracy of the signal A+B as compared to the signal A. Thus, the inclination of the ramp signal VRAMP for the A+B conversion may be made larger than the inclination of the ramp signal VRAMP for the A conversion. In such a case, increasing the size of the inclination of the ramp signal VRAMP during the A+B conversion decreases the AD conversion accuracy. This decrease in AD conversion accuracy due to the increase in the inclination of the ramp signal VRAMP denotes a lowering of the number of bits for the digital signal A+B. By performing a bit-number correction processing on the digital signal A+B with a lowered number of bits with the output signal processing unit 155 illustrated in FIG. 13, for example, the number of bits for the digital signal A+B may be restored to the same number of bits as when the inclination of the ramp signal VRAMP for the A+B conversion is the same as that for the A conversion.

As another embodiment to shorten the period Ttotal, the signal amplitude VA and the signal amplitude VAB for the ramp signal VRAMP is the same signal amplitude, and so the period TA is made shorter than the period TAB by making the size of the inclination of the ramp signal VRAMP for the A conversion larger than that for the A+B conversion. Compared to such an embodiment, the advantage of the imaging apparatus of the present embodiment is that the period TA is made shorter than the period TAB without having to change the inclination of the ramp signal VRAMP for the A conversion and the A+B conversion while also suppressing a decrease in AD conversion accuracy.

Also, it is preferable if a relationship expression $(VA/VAB) \geq (n/m)$ is satisfied regarding the signal amplitude VAB for the reference signal to compare the signal A+B based on the m number of photoelectric conversion units and the signal amplitude VA for the reference signal to compare the signal A based on the n number of photoelectric conversion units. In other words, it is preferable if the signal amplitude VA is n/m times larger than the signal amplitude VAB. This relationship expression is particularly applicable when the surface area of the photodiodes 1 and 51 are nearly identical.

With the present embodiment, a mode was described where the change in potential, depending on time, was started from a potential that was the same for the ramp signal VRAMP for both the A conversion and the A+B conversion. The present embodiment is not limited to this mode, and so the change in potential, depending on time, may be started from a potential that is different for the ramp signal VRAMP for the A conversion and the A+B conversion, as illustrated in FIG. 5 with the dashed line version of the ramp signal VRAMP during the period of point-in-time t21 through t24. In such a case, the signal amplitude VAB for the A+B conversion is the difference in potential between the point-in-time t22 where the change in the ramp signal VRAMP potential begins and the point-in-time t24 where the change in the ramp signal VRAMP potential ends. This signal amplitude VA may be smaller than the signal amplitude VAB, and the period TA may be shorter than the period TAB. Here, a mode was described where the starting potential of the ramp signal VRAMP for the A+B conversion is offset from the starting potential of the ramp signal VRAMP for the A conversion. Another mode may be made where the ramp starting potential of the ramp signal VRAMP for the A conversion is offset from the ramp starting potential for the A+B conversion. Also, another mode may be made where the starting potential of the ramp signal VRAMP for the N conversion is offset from the starting potential of the ramp signal VRAMP for the A conversion and the A+B conversion.

With the present embodiment, a mode has been basically described with focal point detection pixels arranged with the photodiodes 1 and 51 under the single microlens 23. However, the present embodiment is not limited to the mode of focal-point detection pixels, a mode may be made where either the signal A or the signal B and the signal A+B are output.

Figure 6:
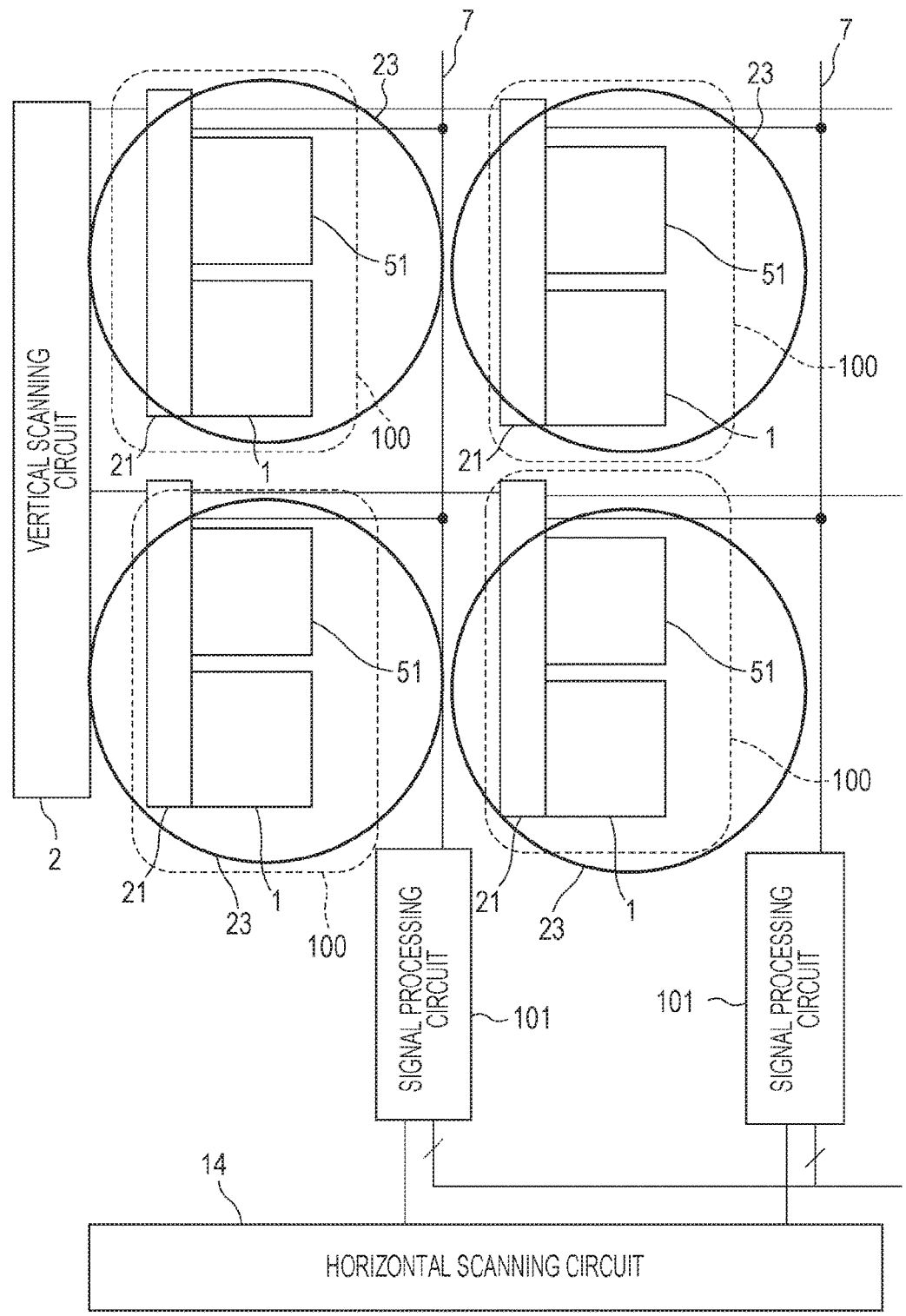
FIG. 6 is an overhead view and an equivalent circuit diagram of an imaging apparatus according to another embodiment.

Also, the imaging apparatus of the present embodiment has been basically described with the photodiodes 1 and 51 arranged in the second column, but as illustrated in FIG. 6, the photodiodes 1 and 51 may be arranged in the second row. In such a case, operation may be performed according to the operation timing as illustrated in FIG. 5.

The imaging apparatus in the present embodiment includes a configuration where the counter circuit 11 is electrically connected to each column of the memory 13, but a so-called shared counter type of columned ADC may also be employed in which the counter circuit 11 transfers a shared count signal to multiple columns of the memory 13.

Also, the present embodiment has been described with the imaging apparatus including pixel units that include multiple pixels, but the embodiment may also be preferably implemented with the provisioning of one pixel and one analog-to-digital conversion unit to which the pixel signal is input.

As previously described, according to the imaging apparatus of the present embodiment, at least two pixels signals that are known to have different viable signal ranges are selected to be converted to digital signals, and the pixel signal with the smaller viable signal range is converted to a digital signal. In such a case, the signal amplitude of the ramp signal VRAMP is made smaller, and the period T to change the ramp signal VRAMP is also shorter as compared to a case when converting the other pixel signal to a digital signal. Specifically, the signal amplitude of the potential of the ramp signal VRAMP is expressed as VAB>VA. Further, the relationship expression TAB>TA should be satisfied regarding the periods TAB and TA to change the ramp signal VRAMP. As a result, the period Ttotal to convert the pixel signals into digital signals may be shortened. The period Ttotal may be shortened further by satisfying the expression VA>VN regarding the range to change the potential of the ramp signal VRAMP, and satisfying the relationship expression TA>TN regarding the periods TA and TN for changing the ramp signal VRAMP.

Second Embodiment

Figure 7:
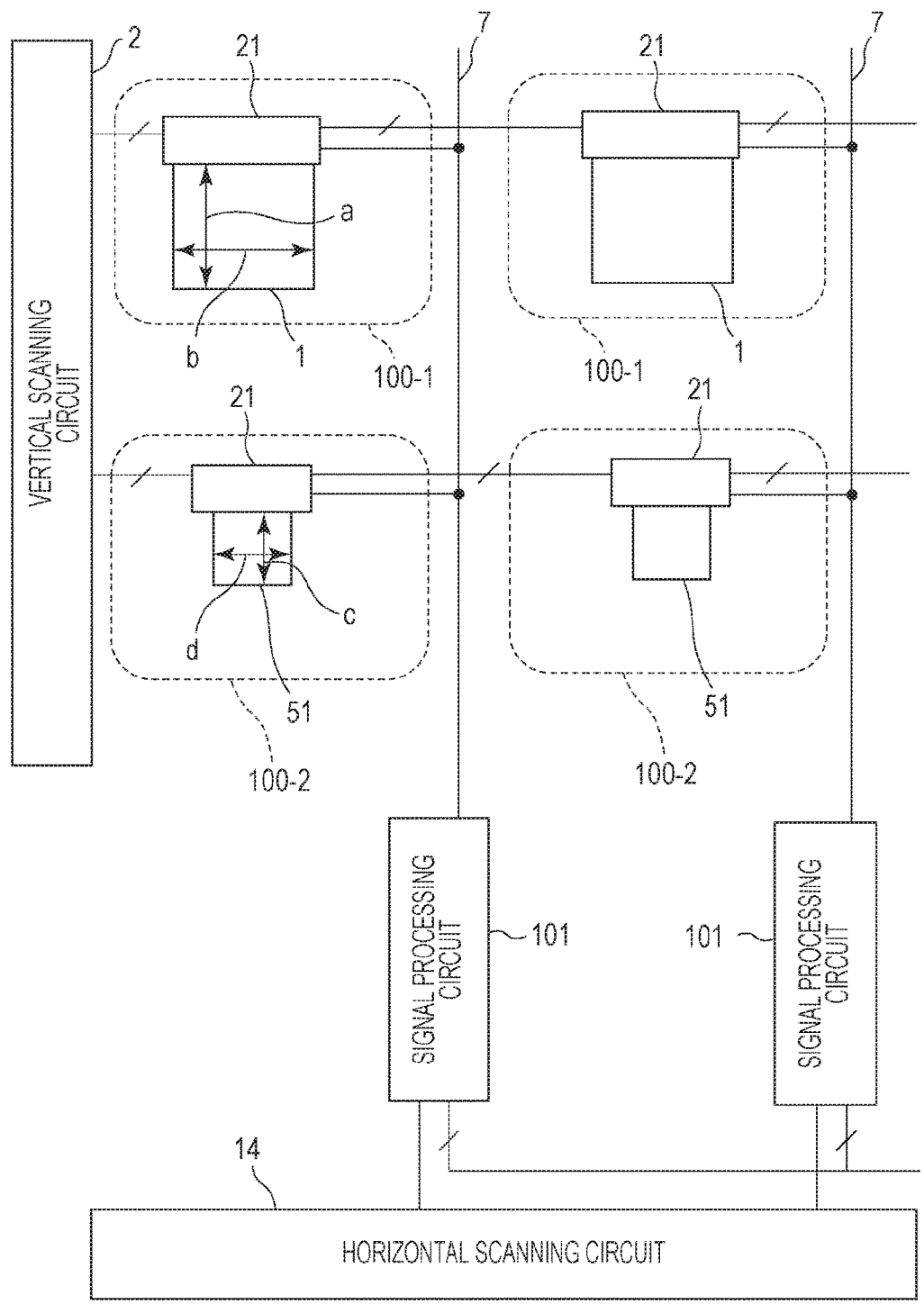
FIG. 7 is an overhead view and an equivalent circuit diagram of an imaging apparatus according to another embodiment.

The description of the present embodiment will focus on the differences between the first embodiment. FIG. 7 is an overhead view of the pixel 100 in the imaging apparatus of the present embodiment. The members illustrated in FIG. 7 that have the same functions as those in FIG. 1 are denoted with the same reference numerals.

The pixel 100 in the imaging apparatus of the present embodiment is provisioned so that when the same amount of light is input, the signal charge amount generated by the photodiode 1 is larger than the signal charge amount generated by the photodiode 51. The present embodiment is provisioned so that the surface area of the photodiode 1 is larger than the surface area of the photodiode 51. The pixel 100-1 that includes the photodiode 1 is the first pixel, and the pixel 100-2 that includes the photodiode 51 is the second pixel. Thus, when the same amount of light is input, the signal amplitude of the photoelectric conversion signal output by the second pixel is smaller than the signal amplitude of the photoelectric conversion signal output by the first pixel.

Figure 8:
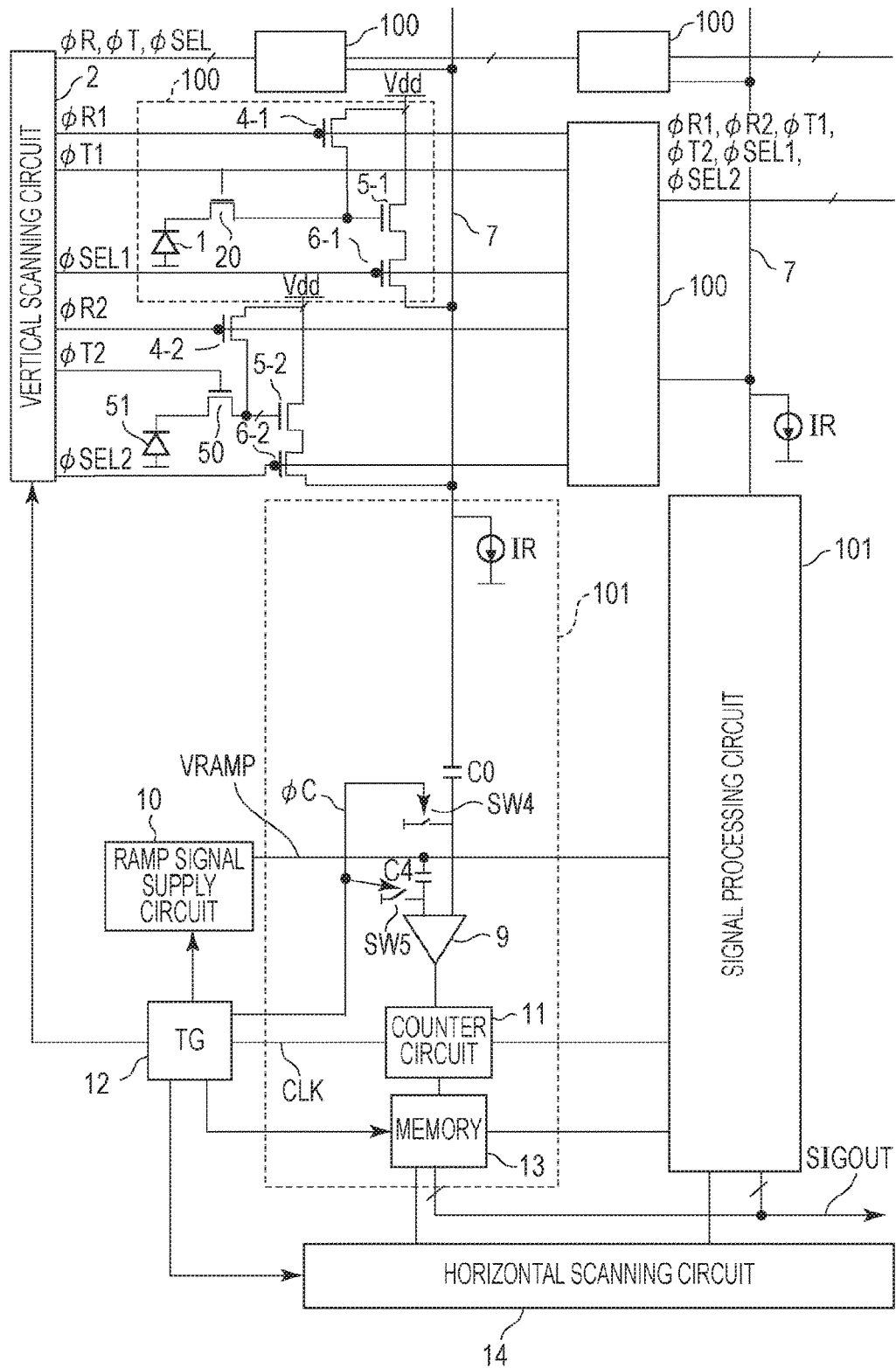
FIG. 8 is an equivalent circuit diagram of an imaging apparatus according to another embodiment.

FIG. 8 is a schematic diagram illustrating an equivalent circuit of the pixels 100 and the signal processing circuit 101 in the imaging apparatus of the present embodiment. The members illustrated in FIG. 8 that have the same functions as those in FIG. 3 are denoted with the same reference numerals as in FIG. 3.

In the first embodiment, the signal charge generated by the photodiodes 1 and 51 are transferred to the input node of the amplifier MOS transistor 5. In the pixels 100 of the present embodiment, the signal charge generated by the photodiode 1 is transferred to the input node of an amplifier MOS transistor 5-1 via the transfer MOS transistor 20. Also, the signal charge generated by the photodiode 51 is transferred to an FD area 52 via the transfer MOS transistor 50. The reset MOS transistors 4-1 and 4-2, which reset the potential of the input nodes of the amplifier MOS transistors 5-1 and 5-2 are electrically connected to the input nodes of the amplifier MOS transistors 5-1 and 5-2. Reset pulses $\phi$R1 and $\phi$R2 are supplied to the gates of the reset MOS transistors 4-1 and 4-2, respectively. The amplifier MOS transistor 5-1 is electrically connected to the vertical signal line 7 via the selection MOS transistor 6-1, and the amplifier MOS transistor 5-2 is electrically connected to the vertical signal line 7 via the selection MOS transistor 6-2, respectively. Selection pulses $\phi$SEL1 and $\phi$SEL2 are supplied to the gates of the selection MOS transistors 6-1 and 6-2, respectively. According to the present embodiment, the signal A, which is the pixel signal A based on the signal charge generated by the photodiode 1, and the signal B, which is the pixel signal based on the signal charge generated by the photodiode 51, are output by time division to the vertical signal line 7. In the first embodiment, the capacitor C1 and C2 were provisioned in the operational amplifier 8 and in the feedback path from the output terminal to the input terminal of the operational amplifier 8. In contrast, the present embodiment does not include the operational amplifier 8. Thus, the pixel signal output to the vertical signal line 7 is output to the comparator 9 via the clamp capacitor C0. As the imaging apparatus of the present embodiment does not include the operational amplifier 8, the signal output to the comparator 9 in the imaging apparatus of the present embodiment has potential of which the sign is reversed as compared to the signal input to the comparator 9 in the imaging apparatus of the first embodiment. Therefore, the direction that the ramp signal VRAMP changes is opposite to the direction as that of the imaging apparatus in the first embodiment.

Figure 9:
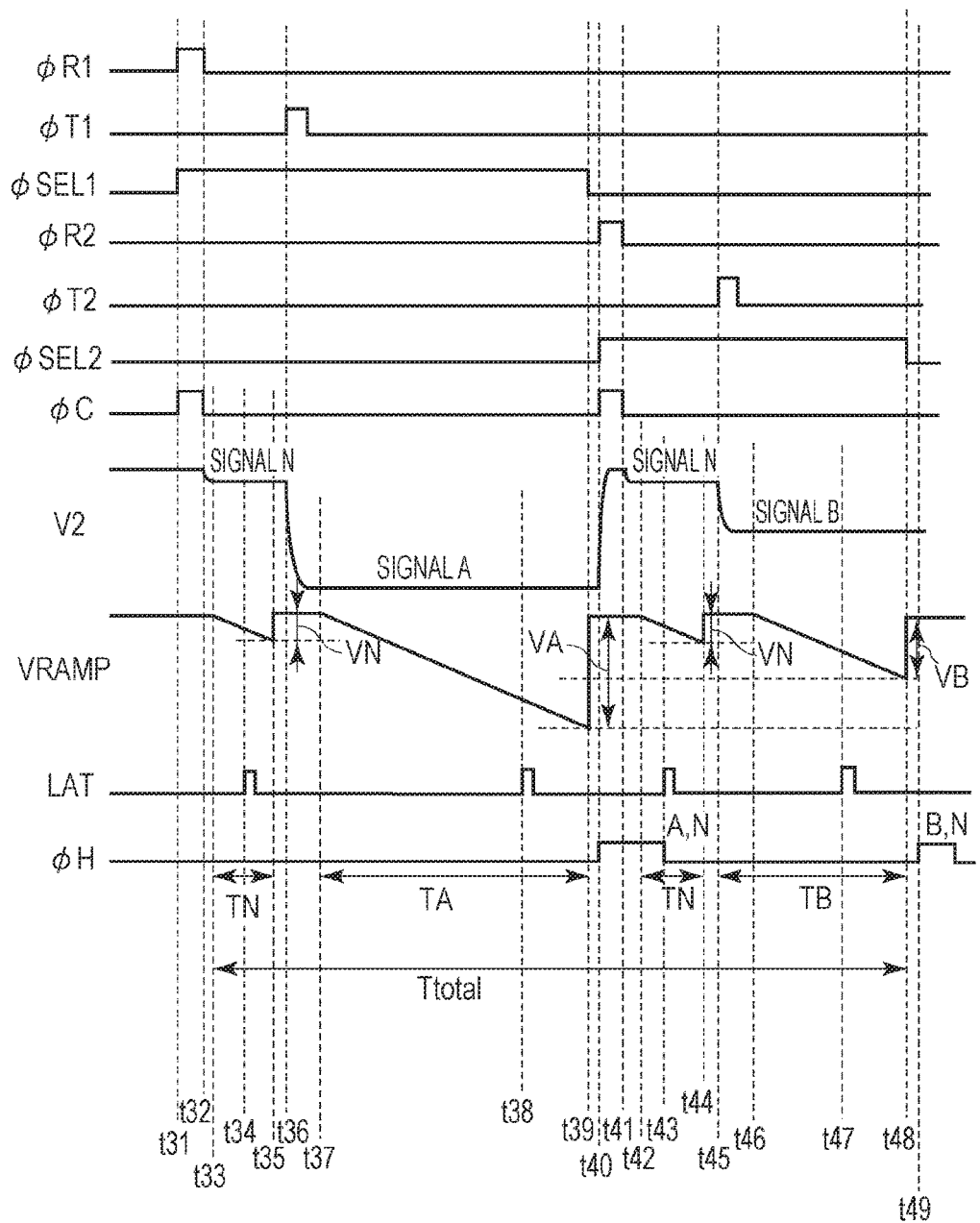
FIG. 9 is a diagram illustrating operation timing of the imaging apparatus according to another embodiment.

Next, FIG. 9 is a diagram illustrating an example of the operation timing for the imaging apparatus illustrated in FIG. 8. Reference numeral V2 denotes the potential of the vertical signal line 7.

At point-in-time t31, the reset pulse $\phi$R1, the selection pulse $\phi$SEL1, and the switch pulse $\phi$C change to H level. The potential of the input node of the amplifier MOS transistor 5-1 is reset by the reset pulse $\phi$R1 changing to H level. Changing the selection pulse $\phi$SEL1 to H level causes the pixel signal at the time when the potential of the input node of the amplifier MOS transistor 5-1 is at the reset level to be output from the pixel 100 to the vertical signal line 7. The switch pulse $\phi$C changes to H level at the point-in-time t31, and by changing to L level at point-in-time t32, the potential of the pixel signal at the time when the potential of the input node of the amplifier MOS transistor 5-1 is at the reset level output from the pixel 100 is held at the clamp capacitor C0.

At point-in-time t32, the reset pulse φR1 and the switch pulse φC changes to L level.

The operations that occur from a point-in-time T33 to point-in-time t39 may be the same as the operations that occur from the point-in-time t13 to the point-in-time t19 in the first embodiment as illustrated in FIG. 5. The operation that occurs during the period TN from the point-in-time t33 to the point-in-time t35 is the N conversion. Also, the operation that occurs during the period TA from the point-in-time t37 to the point-in-time t39 is the A conversion. According to the present embodiment, at the point-in-time t39, the changing of the selection pulse φSEL1 to L level is the point that is different from the operation illustrated in FIG. 5 for the first embodiment.

At point-in-time t40, the reset pulse φR2, the selection pulse φSEL2, and the switch pulse φC change to H level. The potential of the FD area 52 is reset by the changing of the reset pulse φR2 to H level. The changing of the selection pulse φSEL2 to H level causes the pixel signal at the time when the potential of the FD area 52 is at the reset level to be output from the pixel 100 to the vertical signal line 7. The switch pulse φC changes to H level at the point-in-time t40, and by changing to L level at point-in-time t41, the potential of the pixel signal at the time when the potential of the FD area 52 is at the reset level output from the pixel 100 is held at the clamp capacitor C0. Also, the horizontal selection signal φH changes to H level, and the digital signal N and the digital signal A are output from the memory 13.

At point-in-time t41, the reset pulse φR1 and the switch pulse φC changes to L level.

The operations related to the comparator 9 and the ramp signal supply circuit 10 that occur from point-in-time t42 to point-in-time t44 may be the same as the operations that occur from the point-in-time t33 to the point-in-time t35. The operations that occur during the period TN from this point-in-time t42 to the point-in-time t44 is the N conversion.

At point-in-time t45, the transfer pulse φT2 changes to H level. As a result, the signal charge generated by the photodiode 51 is transferred to the FD area 52. Therefore, the signal based on the potential of the FD area 52 holding the signal charge, which is the signal B specifically, is output from the pixel 100 to the vertical signal line 7.

At point-in-time t46, the ramp signal supply circuit 10 starts changing the ramp signal VRAMP. The operations of the comparator 9 and the ramp signal supply circuit 10 that occur from the point-in-time t46 to the point-in-time t48 may be the same as the A conversion operations that occur from the point-in-time t37 to the point-in-time t39. The operations that occur during the period TB from this point-in-time t46 to the point-in-time t48 is called the B conversion.

The viable signal amplitude of the signal B is smaller than the viable signal amplitude of the signal A. Therefore, the signal amplitude VB of the ramp signal VRAMP for the B conversion is also smaller than the signal amplitude VA of the ramp signal VRAMP for the A conversion. Also, the period TB is shorter than the period TA. By making the period TB shorter than the period TA, the period Ttotal to convert the pixel signals to digital signals may be made shorter as compared to a case when the period TB and the period TA take the same amount of time.

At point-in-time t49, the horizontal selection signal φH changes to H level, and the digital signal A and the digital signal B are output from the memory 13.

In the imaging apparatus of the present embodiment, the inclination of the ramp signal VRAMP for both the A conversion and the B conversion is the same, and yet the period TB may be made shorter than the period TA. In such a case, the accuracy of the AD conversion is not different between the A conversion and the B conversion, yet the period Ttotal may be shortened as compared to the case when the period TA and the period TB take the same amount of time. Also, the inclination of the ramp signal VRAMP for the N conversion may also be made the same as the A conversion and the B conversion. Also in such a case, the accuracy of the AD conversion is not different between the N conversion, A conversion, and the B conversion, yet the period Ttotal may be shortened as compared to the case when the period TN and the period TA take the same amount of time.

As another mode to shorten the period Ttotal, the signal amplitude VA for the ramp signal VRAMP and the signal amplitude VB for the ramp signal VRAMP is the same, and the inclination of the ramp signal VRAMP for the B conversion is larger than that for the A conversion, which enables the period TB to be shorter than the period TA. Compared to such a mode, the advantages of the imaging apparatus in the present embodiment is that by not changing the inclination of the ramp signal VRAMP for both the A conversion and the B conversion, decreases in AD conversion accuracy are suppressed, and the period TB is made shorter than the period TA.

It is preferable if the signal amplitude VA for the ramp signal VRAMP is set to correspond with the pixel signals based on the saturated level signal charge generated by the photodiode 1. For example, the minimum value of the ramp signal VRAMP for the A conversion is set to be nearly equal to the pixel signal based on the saturated level signal charge generated by the photodiode 1. As a result, the signal range of analog signals that are convertible to digital signals is not impaired so much, and the period TA may be shortened. Similarly, it is also preferable if the signal amplitude VB for the ramp signal VRAMP is set to correspond with the pixel signals based on the saturated level signal charge generated by the photodiode 51. For example, the minimum value of the ramp signal VRAMP for the B conversion is set to be nearly equal to the pixel signal based on the saturated level signal charge generated by the photodiode 51. As a result, the signal range of analog signals that are convertible to digital signals is not impaired so much, and the period TB may be shortened.

With the present embodiment as well, the example presented has the viable signal range of the signal B smaller than the viable signal range of the signal A, and with a configuration where the surface area of the photodiode 51 is smaller than the surface area of the photodiode 1. Besides this configuration example, a different configuration where the viable signal range of the signal B is smaller than the viable range of the signal A may be employed in the present embodiment. Such example include a configuration where the photodiodes 1 and 51 have different levels of impurity, or a configuration where a light-shielding member is provisioned above the incident light path on one of the photodiodes 1 and 51. In other words, at least two pixel signals that are known to have different viable signal ranges are selected to be converted to digital signals, and the pixel signal with the smaller viable signal range is converted to a digital signal. In such a case, the signal amplitude of the ramp signal VRAMP is made smaller, and the period T to change the ramp signal VRAMP is also shorter as compared to a case when converting the other pixel signal to a digital signal. Such a configuration enables the period Ttotal to convert at least two pixel signals into digital signals to be shortened as compared to a case where at least two pixel signals are converted into digital signals using a ramp signal VRAMP with a shared signal amplitude and change period.

Third Embodiment

Figure 10:
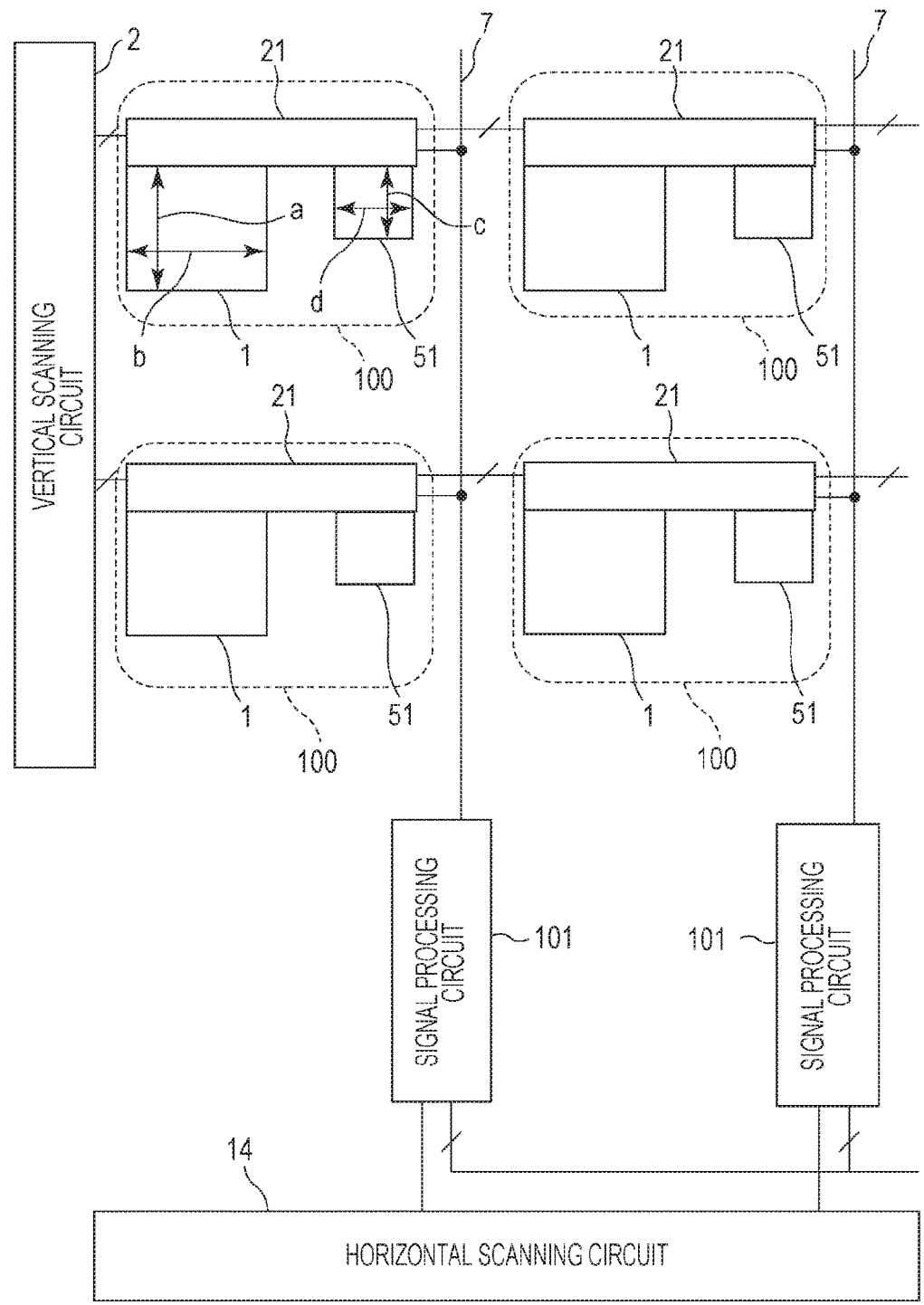
FIG. 10 is an overhead view and an equivalent circuit diagram of an imaging apparatus according to another embodiment.

The description of the present embodiment will focus on the differences between the first embodiment. FIG. 10 is a top view diagram of the pixels 100 of the imaging apparatus in the present embodiment. The members illustrated in FIG. 10 that have the same functions as those in FIG. 1 are denoted with the same reference numerals. The imaging apparatus illustrated in FIG. 10 has a configuration where the surface area of the photodiode 1 is larger than the surface area of the photodiode 51. In other words, the sensitivity of the photodiode 1 is higher than the sensitivity of the photodiode 51. Thus, when the same amount of light is input on the photodiodes 1 and 51, the signal charge amount generated by the photodiode 1 is larger than the signal charge amount generated by the photodiode 51. Therefore, when the same amount of light is input on the photodiodes 1 and 51, the signal amplitude for the signal A based on the photodiode 1 is larger than the signal amplitude of the signal B based on the photodiode 51.

Figure 11:
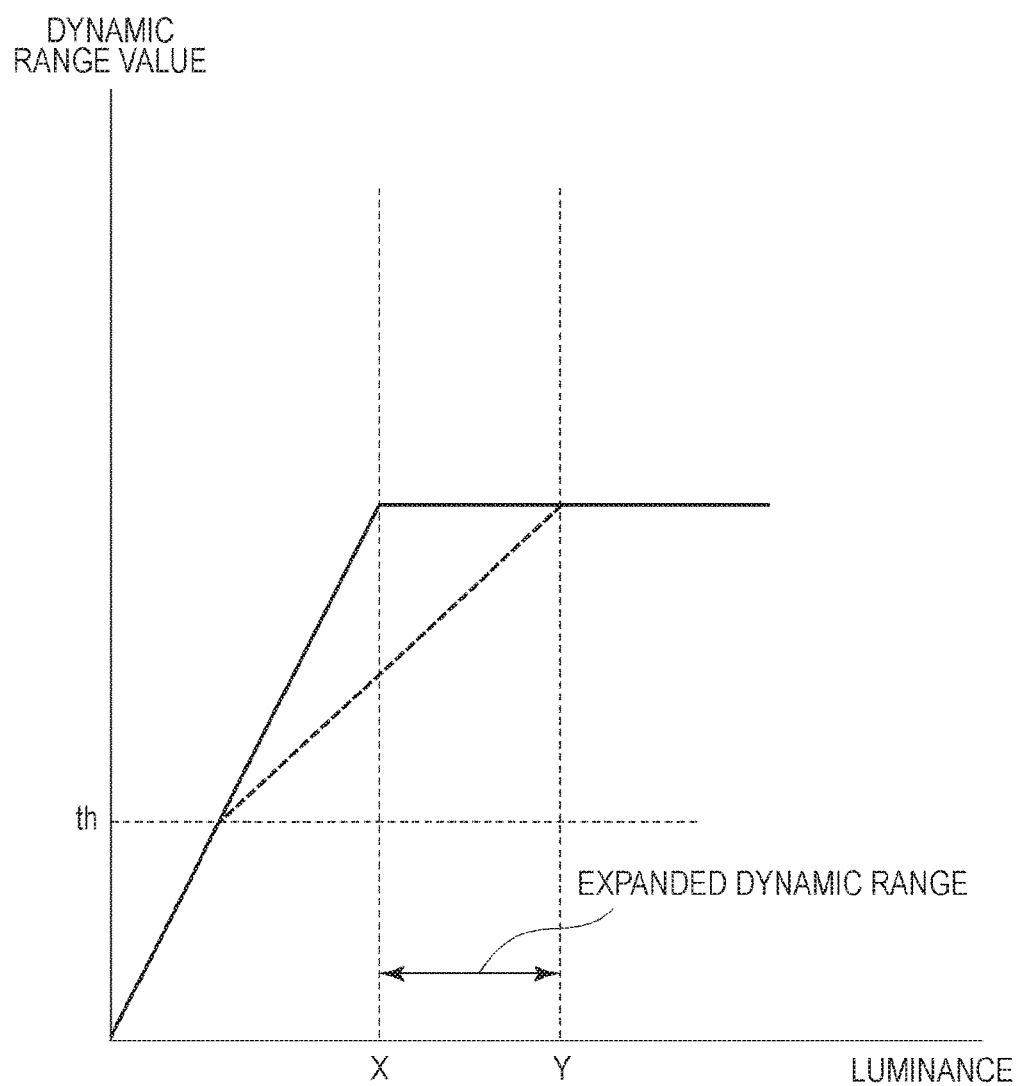
FIG. 11 is a diagram illustrating the dynamic range related to the imaging apparatus according to another embodiment.

Dynamic range can be expanded by using the signal A and the signal B that are based on signal charges generated by the photodiodes 1 and 51 that each have different sensitivities. FIG. 11 is a diagram illustrating the expanded dynamic range obtained by adding together the signal A, which is a signal with high sensitivity, and the signal B, which is a signal with low sensitivity. When the signal A, which is a signal with high sensitivity, is used, the signal becomes saturated at luminance X as illustrated by the solid line. Further change in the gradation value expressing a luminance greater than the luminance X is not possible with only the signal A. In contrast, a region in which the gradation value is at or over the threshold th is illustrated by the dashed line in FIG. 11, which is the relationship between the gradation value and the luminance when using the signal B, which is a signal with a low sensitivity. As illustrated by the dashed line, an expression of luminance greater than X up to a luminance Y is possible when the signal B is used with the region in which the gradation value is at or over the threshold th. Accordingly, the dynamic range may be expanded from luminance X to luminance Y. The present embodiment has been described where only the signal B is used with the region in which the gradation value is at or over the threshold th, but a weight may be given to both the signal A and the signal B, and then added together. For example, 70% of the signals A and 30% of the signals B may be added together. In such an embodiment, the dynamic range may still be expanded as compared to a cased when only using the signal A.

Also, a block diagram illustrating a schematic of the pixel 100 in the second row, second column and the signal processing circuit 101 in the second column taken from the imaging apparatus illustrated in FIG. 10 may be implemented in the same way as in FIG. 3 regarding the first embodiment.

Next, an operation timing different from that illustrated in FIG. 10 will be described with reference to FIG. 12. According to the operation timing for the output operation of pixel signals from the pixels 100 described based on FIG. 5 regarding the first embodiment, the signal A+B is output after the signal A has been output. In contrast, according to the operation timing illustrated in FIG. 12, the potential of the input node of the amplifier MOS transistor 5 is reset after the signal A has been output, and then the signal N and the signal B are output. Also, the operation of the signal processing circuit 101 is the same as the operation of the signal processing circuit 101 as illustrated in FIG. 9 regarding the second embodiment.

Figure 12:
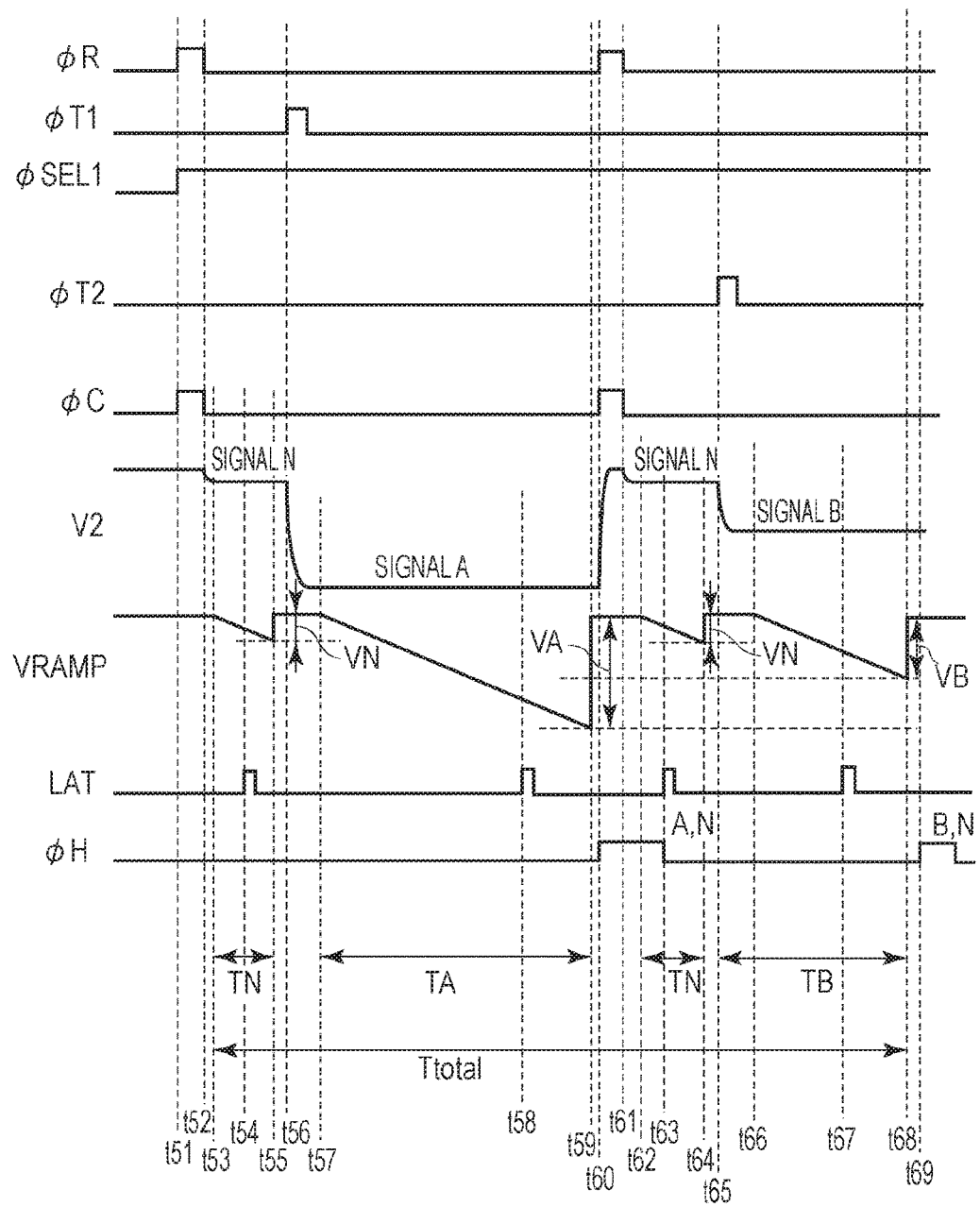
FIG. 12 is a diagram illustrating operation timing of the imaging apparatus according to another embodiment.

The following will describe the operation timing illustrated in FIG. 12. The operations that occur from point-in-time t51 to point-in-time t60 may be the same as the operations that occur from the point-in-time t11 to the point-in-time t20 per the operation timing in FIG. 5 regarding the first embodiment, excluding the previously described direction to which the ramp signal VRAMP changes.

At point-in-time t61, the reset pulse φR is changed to H level, and the potential of the input node of the amplifier MOS transistor 5 is reset. Also, the switch pulse φC is changed to H level, and charge held in the clamp capacitors C0 and C4 are reset. The selection pulse φSEL1 continues to be at H level.

At point-in-time t62, the reset pulse φR and the switch pulse φC are changed to L level, and the potential of the clamp capacitors C0 and C4 at the time when the reset pulse φR and the switch pulse φC are changed to L level is held.

The operations that occur from point-in-time t63 to point-in-time t69 are the same as the operations that occur from the point-in-time t42 to the point-in-time t49 per the operation timing in FIG. 9 regarding the second embodiment.

According to the present embodiment, the viable signal amplitude of the signal B is also smaller than the viable signal amplitude of the signal A. Therefore, the signal amplitude VB of the ramp signal VRAMP for the B conversion is smaller than the signal amplitude VA of the ramp signal VRAMP for the A conversion. Also, the period TB is shorter than the period TA. The period Ttotal to convert the pixel signals into digital signals may be shortened by making the period TB shorter than the period TA as compared to a case in which the period TB and the period TA take the same amount of time.

As another mode to shorten the period Ttotal, the signal amplitude for the signal amplitude VA of the ramp signal VRAMP and the signal amplitude VB of the ramp signal VRAMP is the same, and so by making the inclination of the ramp signal VRAMP for the A conversion larger than that for the B conversion, the period TB is shorter than the period TA. Compared to such a mode, the advantages of the imaging apparatus in the present embodiment is that by not changing the inclination of the ramp signal VRAMP for both the A conversion and the B conversion, decreases in AD conversion accuracy are suppressed, and the period TB is made shorter than the period TA.

As previously described, the imaging apparatus of the present embodiment may operate according to the operation timing in either FIG. 9 or FIG. 12. In either case, the inclination of the ramp signal VRAMP does not have to be changed for the A conversion, A+B conversion, or the B conversion. In such cases, decreases in AD conversion accuracy are suppressed, and the period Ttotal to convert the pixel signals into digital signals may be shortened as compared to a case in which the period TB, the period TAB, and the period TA all take the same amount of time.

As a different mode, the imaging apparatus illustrated in FIG. 10 may operate according to the same operation timing as described based on that in FIG. 5 regarding the first embodiment. However, as the imaging apparatus of the present embodiment does not include the operational amplifier 8, the signals output to the comparator 9 of the imaging apparatus in the present embodiment have a potential of which the sign is reversed from the signals input to the comparator 9 of the imaging apparatus in the first embodiment. Accordingly, the direction where the ramp signal VRAMP is changed is the opposite direction of the imaging apparatus in the first embodiment.

Even in such a mode, the viable signal amplitude for the A+B signal is smaller than the viable signal amplitude for the A signal. Therefore, similar to the First embodiment, the period TA to change the ramp signal VRAMP for the A conversion is made shorter than the period TAB to change the ramp signal VRAMP for the A+B conversion. As a result, the period Ttotal to convert the pixel signals into digital signals may be shorter as compared to a case when the period TA and the period TAB take the same amount of time.

As another mode to shorten the period Ttotal, the signal amplitude for the signal amplitude VA of the ramp signal VRAMP and the signal amplitude VAB of the ramp signal VRAMP are the same, and so by making the inclination of the ramp signal VRAMP for the A conversion larger than that for the conversion B, the period TA is shorter than the period TAB. Compared to such an embodiment, the advantages of the imaging apparatus in the present embodiment is that by not changing the inclination of the ramp signal VRAMP for both the A conversion and the B conversion, decreases in AD conversion accuracy are suppressed, and the period TA is made shorter than the period TAB.

Fourth Embodiment

An embodiment that applies the imaging apparatus described in the first embodiment to an imaging system will be described here. The imaging system may be, for example, a digital still camera, a digital camcorder, or a surveillance camera. FIG. 13 is a schematic diagram illustrating the imaging apparatus is applied to a digital still camera as the example of the imaging system.

The imaging system illustrated in FIG. 13 includes a barrier 151 for lens protection, a lens 152 to form an optical image of the photographic subject to an imaging apparatus 154, and an aperture 153 to vary the amount of light that passes through the lens 152. The lens 152 and the aperture 153 make up the optical system that condenses light to the imaging apparatus 154. Also, the imaging system illustrated in FIG. 13 includes the output signal processing unit 155 to perform processing of output signals output from the imaging apparatus 154.

The output signal processing unit 155 includes a digital signal processing unit to perform difference processing to subtract the digital signal N from the digital signal A and the digital signal A+B, both of which are output from the imaging apparatus 154. Also, the output signal processing unit 155 performs difference processing to subtract the digital signal A from the signal A+B to obtain the signal B. Also, the output signal processing unit 155 also performs operations to output signals after performing various corrections and compressions when desirable.

Also, the imaging system illustrated in FIG. 13 also includes a buffer memory unit 156 to temporarily store image data, an interface unit 157 to communicate with a computer or other external device, an interface unit 158 to perform read/write operations to/from a recording medium, a removable recording medium 159 such as semiconductor memory to perform read/write operations of imaging data, an overall control and computing unit 1510 to control the various calculations and all of the digital still camera, and a timing generator 1511 to output various timing signals to the imaging apparatus 154 and the output signal processing unit 155. Here, timing signals may be input from an external device, and the imaging system may include only the imaging apparatus 154 and the output signal processing unit 155 to process output signals output from the imaging apparatus 154.

The processing to subtract the digital signal B from the digital signal A+B performed by the output signal processing unit 155 is performed on signals output from the same pixel. That is to say, the difference processing is performed on the focal-point detection signal based on the signal A output from the pixel 100 and the image obtaining signal based on the signal A+B output from the pixel 100 that output the focal-point detection signal. As a result, the signal based on the signal B from the pixel 100 may be obtained, and the phase difference detecting method of focal-point detection may be performed by comparing the signal values of the signal based on this signal and the signal A.

As previously described, the imaging system of the present embodiment may perform focal-detection operations and imaging operations with the application of the imaging apparatus 154.

Fifth Embodiment

Figure 14A:
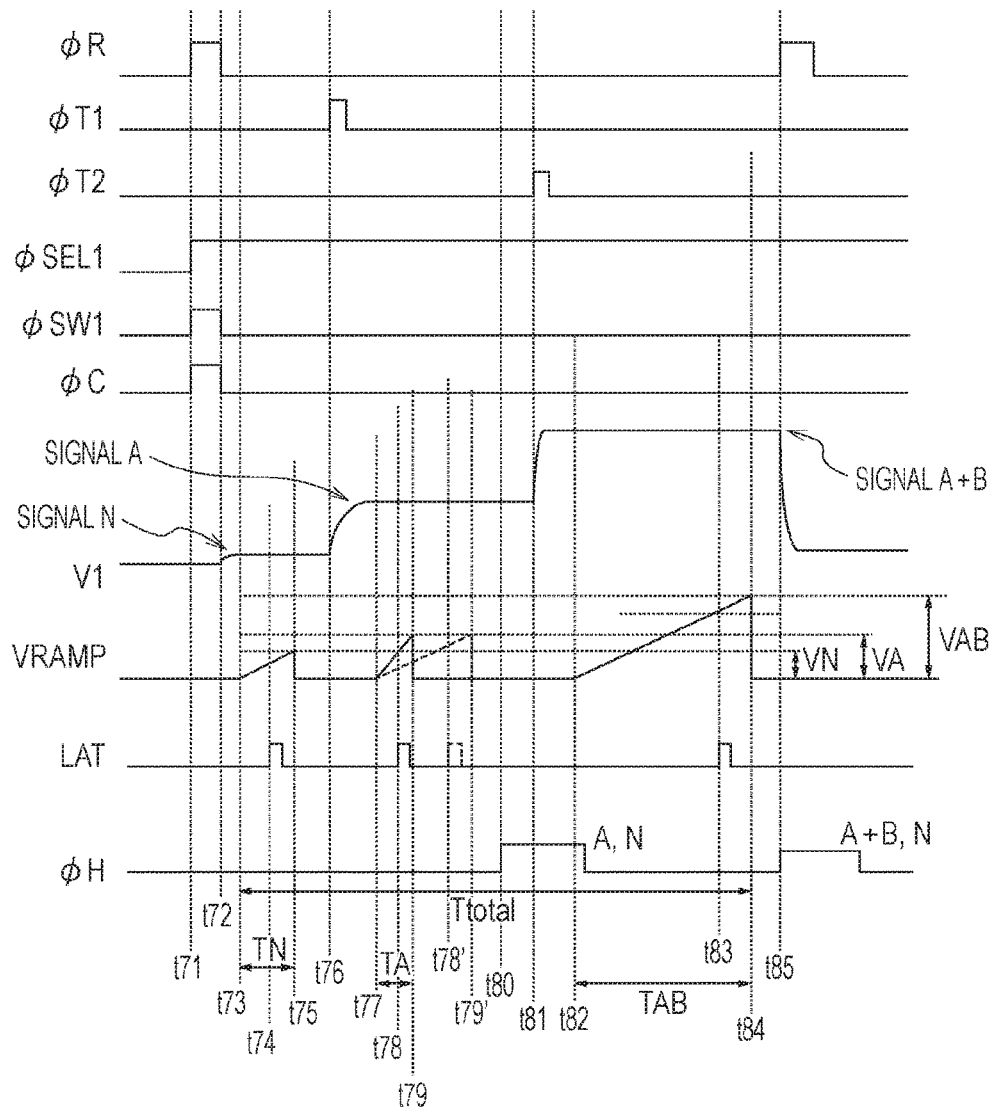
FIG. 14A is a diagram illustrating operation timing of the imaging apparatus according to another embodiment.

The description of the present embodiment will focus on the differences as to the first embodiment. FIG. 14A is a diagram illustrating the operation timing of the present embodiment. The operations that occur from point-in-time t71 to point-in-time t77 illustrated in FIG. 14A may be the same as the operations that occur from the point-in-time t11 to the point-in-time t17 per the operation timing in FIG. 5 regarding the first embodiment. Also, The operations that occur from point-in-time t81 to point-in-time t85 may be the same as the operations that occur from the point-in-time t20 to the point-in-time t25 per the operation timing in FIG. 5 regarding the first embodiment. The operations illustrated in FIG. 14A that are different from the operations per the operation timing in FIG. 5 regarding the first embodiment are the operations that occur from point-in-time t77 through t79 for the period TA. For comparison purposes, the operations corresponding to the point-in-time t17, t18, and t19 of the first embodiment are denoted in FIG. 14A by t77, t78', and t79'.

Comparing the operations illustrated in the FIG. 14A with the operations described with reference to FIG. 5 regarding the first embodiment, the amplitude VA of the ramp signal VRAMP for the A conversion is the same, and the potential change amount per unit of time is doubled. Therefore, the period TA for the A conversion may be shortened to half the time as the operation described with reference to FIG. 5 regarding the first embodiment. Thus, the period from the point-in-time t79 to the point-in-time t79' illustrated in FIG. 14A may be shortened.

Therefore, according to the present embodiment, the potential change amount of the ramp signal VRAMP for the A conversion per unit of time is twice the potential change amount of the ramp signal VRAMP for the A+B conversion per unit of time. By making the inclination of the ramp signal VRAMP for the A conversion twice that of the ramp signal for the A+B conversion, the AD conversion count for the amplitude VA is reduced by one-half. As a result, the resolution of the signal A is lower than the resolution of the signal A+B. The low resolution described in the present specification specifies a signal range for the analog signal that is larger than a high resolution by one LSB of the digital signal. Correction of the digital signal A generated at a low resolution to the resolution of the digital signal A+B will be described next with reference to FIG. 14B.

Figure 14B:
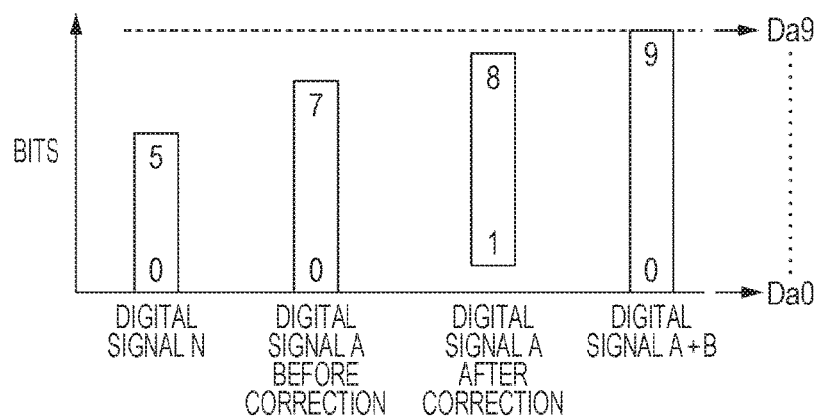
FIG. 14B is a diagram illustrating an example of digital signal correction.

FIG. 14B is a schematic diagram illustrating the valid bits for each of the signals of the digital signal N, the digital signal A, and the digital signal A+B. Data bit Da0 is the LSB, and Da9 is the MSB.

According to the present embodiment, the digital signal A+B is expressed with 10 bits, and so if the amplitude VN is 1/16 the size of the amplitude VAB, the digital signal N illustrated in FIG. 14B is expressed with 6 bits. For this reason, data bits Da0 through Da5 are the valid bits for the signal in FIG. 14B.

In contrast, if looking at the digital signal A before correction, by making the inclination of the ramp signal VRAMP for the A conversion twice that of the ramp signal for the A+B conversion, the AD conversion count for the amplitude VA is reduced to one-half, the valid bits for signal is only reduced by one regarding the digital signal A+B. According to the present embodiment, the amplitude VA of the ramp signal VRAMP for the A conversion is one-half the amplitude VAB of the ramp signal VRAMP for the A+B conversion, and so the bit count of the digital signal A is further reduced by one bit regarding the digital signal A+B. Thus, the digital signal A before correction is expressed with 8 bits, from data bit Da0 through Da7.

The inclination of the ramp signal VRAMP used in the conversion A is twice that of the ramp signal VRAMP used in the conversion N and the conversion A+B, and as the digital signal A before correction is used in both the digital signal N and the digital signal A+B, correction should be performed on this signal. Specifically, each of the data bits Da0 through Da7 are bit shifted up by one digit. An arbitrary value may be set for the data bit Da0 after the bit shift is performed.

The correction of the digital signal A may be performed at the memory 13. The memory 13 performs the bit shift to shift each bit of data of the digital signal A before correction up by one bit. That is to say, the bit Da0, which is the LSB of the digital signal A before correction is bit shifted to the bit Da1. The other bits are similarly shifted up by one bit. As a result, the digital signal A is changed to a digital signal with signal values using bits one through eight. Also, the bit Da0, which is the LSB, is given a signal value of 0.

Further, the correction of this digital signal A may be performed when the clock signal CLK is counted by the counter circuit 11 described in the first embodiment. Also, the memory 13 may perform the correction of the digital signal A when the count signal generated by the counter circuit 11 is held at the memory 13. Also, the correction of the digital signal A may be performed by the memory 13 in conjunction with the consecutive output of the digital signal A, or may be performed by the output signal processing unit 155 provisioned externally from the imaging apparatus 154, as per the kind of imaging system in the fourth embodiment.

Sixth Embodiment

Figure 15:
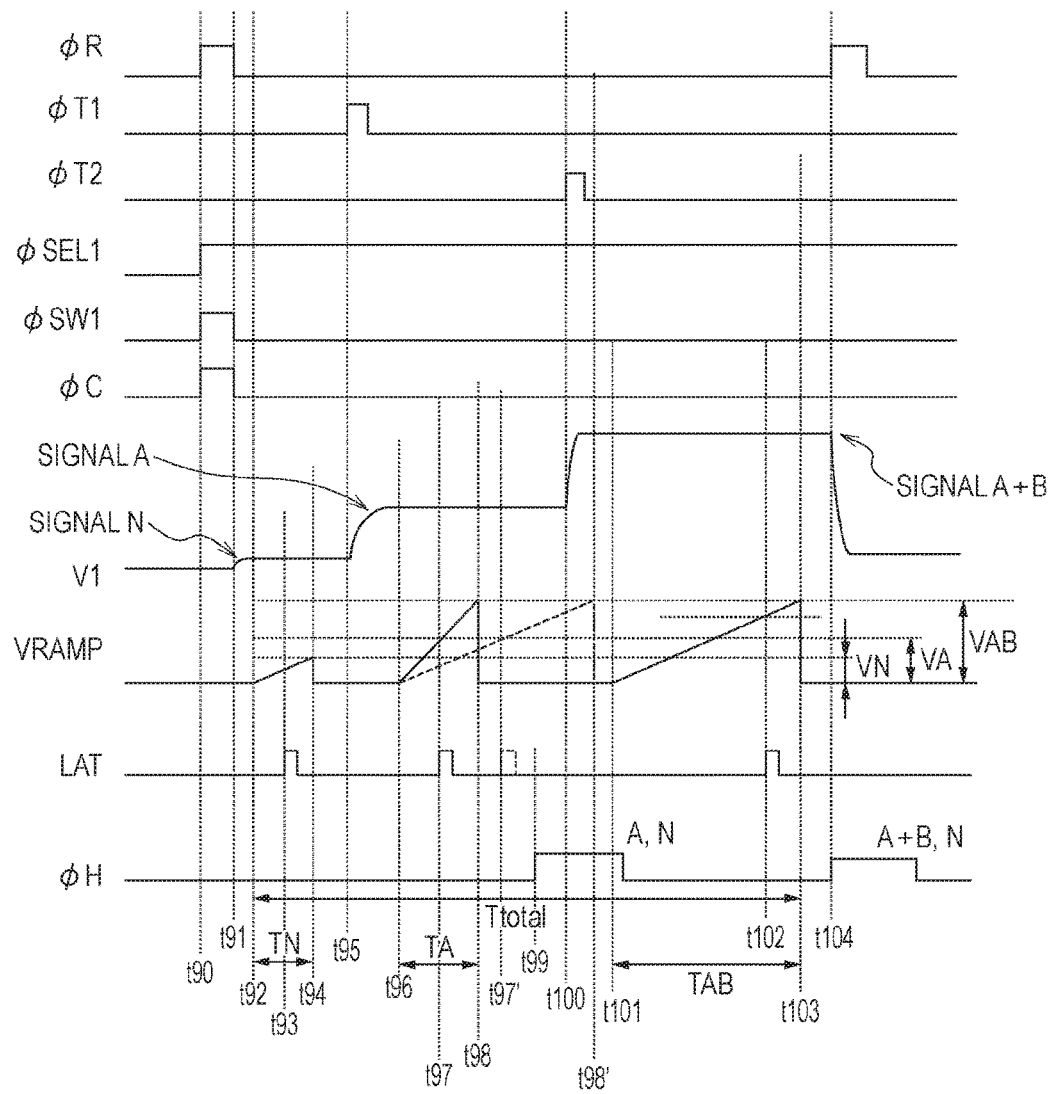
FIG. 15 is a diagram illustrating operation timing of the imaging apparatus according to another embodiment.

The description of the present embodiment will focus on the differences between the fifth embodiment. FIG. 15 is a diagram illustrating the operation when the potential change amount of the ramp signal VRAMP per unit of time for the A conversion is double that for the A+B conversion, though the ramp signal amplitude VA and VAB for the A conversion and the A+B conversion is the same. The operations that occur from point-in-time t90 to point-in-time t96 illustrated in FIG. 15 may be the same as the operations that occur from the point-in-time t71 to the point-in-time t77 illustrated in FIG. 14A regarding the fifth embodiment. The operations that occur from point-in-time t99 to point-in-time t104 illustrated in FIG. 15 may be the same as the operations that occur from the point-in-time t81 to the point-in-time t85 illustrated in FIG. 14A.

When the potential change amount per unit of time of the ramp signal VRAMP for the A conversion and the ramp signal VRAMP for the A+B conversion are the same, the period TA for the A conversion is the operations illustrated by the dotted lines for point-in-time t96 through t98'. In contrast, if the potential change amount of the ramp signal VRAMP per unit of time for the A conversion is double that of the A+B conversion as in the present embodiment, the period TA for the A conversion is the operations illustrated by the solid lines for point-in-time t96 through t98. Thus, according to the present embodiment, the period TA for the A conversion is shorted to one-half as compared to a case where the potential change amount per unit of time is the same for the ramp signal VRAMP for the A conversion and the ramp signal VRAMP for the A+B conversion.

Further, the correction of the digital signal A generated by the operations of the present embodiment may be the same operations described for the fifth embodiment with reference to FIG. 14B.

Seventh Embodiment

The imaging apparatus of the present embodiment changes the potential change amount of the ramp signal VRAMP for the A+B conversion per unit of time, depending on the signal level of the signal A+B. The imaging apparatus of the present embodiment will be described with reference to the drawings.

Figure 16:
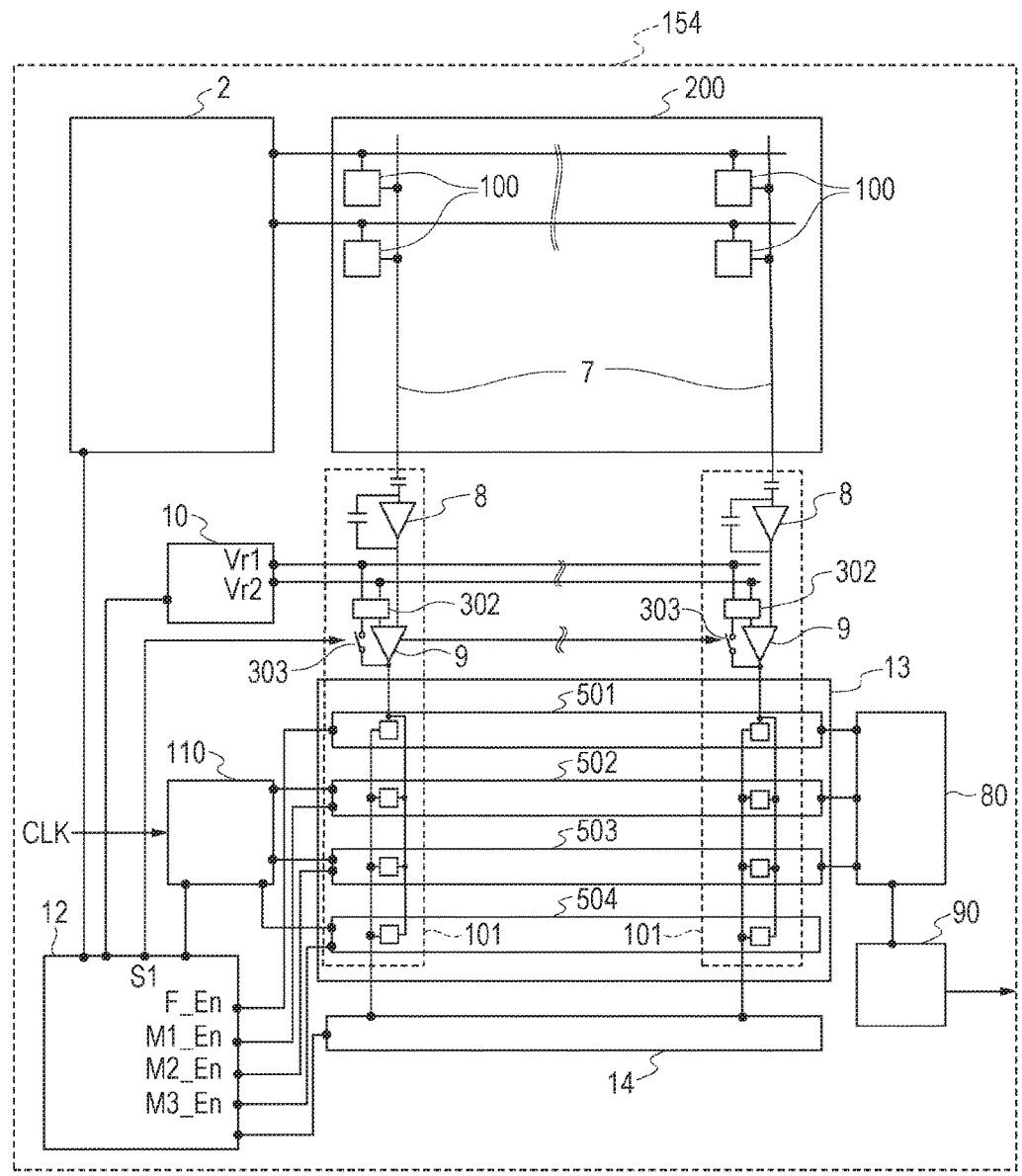
FIG. 16 is an equivalent circuit diagram of the imaging apparatus according to another embodiment.

FIG. 16 is a schematic diagram of the imaging apparatus in the present embodiment. The imaging apparatus 154 includes a pixel unit 200 where the pixels 200 are arrayed in multiple rows and multiple columns. The ramp signal supply circuit 10 outputs ramp signals Vr1 and Vr2 to a selection circuit 302 in each column. The comparator 9 outputs a selection signal to the selection circuit 302 via a switch 303, based on a comparison result signal CMP, which represents the result of comparing the signal output from the operational amplifier 8 and a threshold signal. The selection circuit 302 selects the ramp signal VRAMP output to the comparator 9 from among the multiple ramp signals Vr1 and Vr2, based on the selection signal. The comparator 9 outputs the latch signal LAT to the memory 13, based on the comparison result signal CMP, which represents the result of comparing the signal output from the operational amplifier 8 and the ramp signal VRAMP. The memory 13 includes first memory 502, and second memory 503, and third memory 504. A TG 110 outputs a signal F_En to flag memory 501. The counter circuit 110 outputs the count signal from counting the clock signal CLK to the first memory 502, the second memory 503, and the third memory 504. The TG 110 outputs a signal M1_En, a signal M2_En, and a signal M3_En to the first memory 502, the second memory 503, and the third memory 504 respectively. The horizontal scanning circuit 14 consecutively outputs the digital signal held in the flag memory 501, the first memory 502, the second memory 503, and the third memory 504 in each column to a DSP 80. The DSP 80 processes the signals output from the flag memory 501, the first memory 502, the second memory 503, and the third memory 504, and outputs this to an output circuit 90. The output circuit 90 outputs the signals to a device external from the imaging apparatus, based on the signals output from the TG 110.

Figure 17:
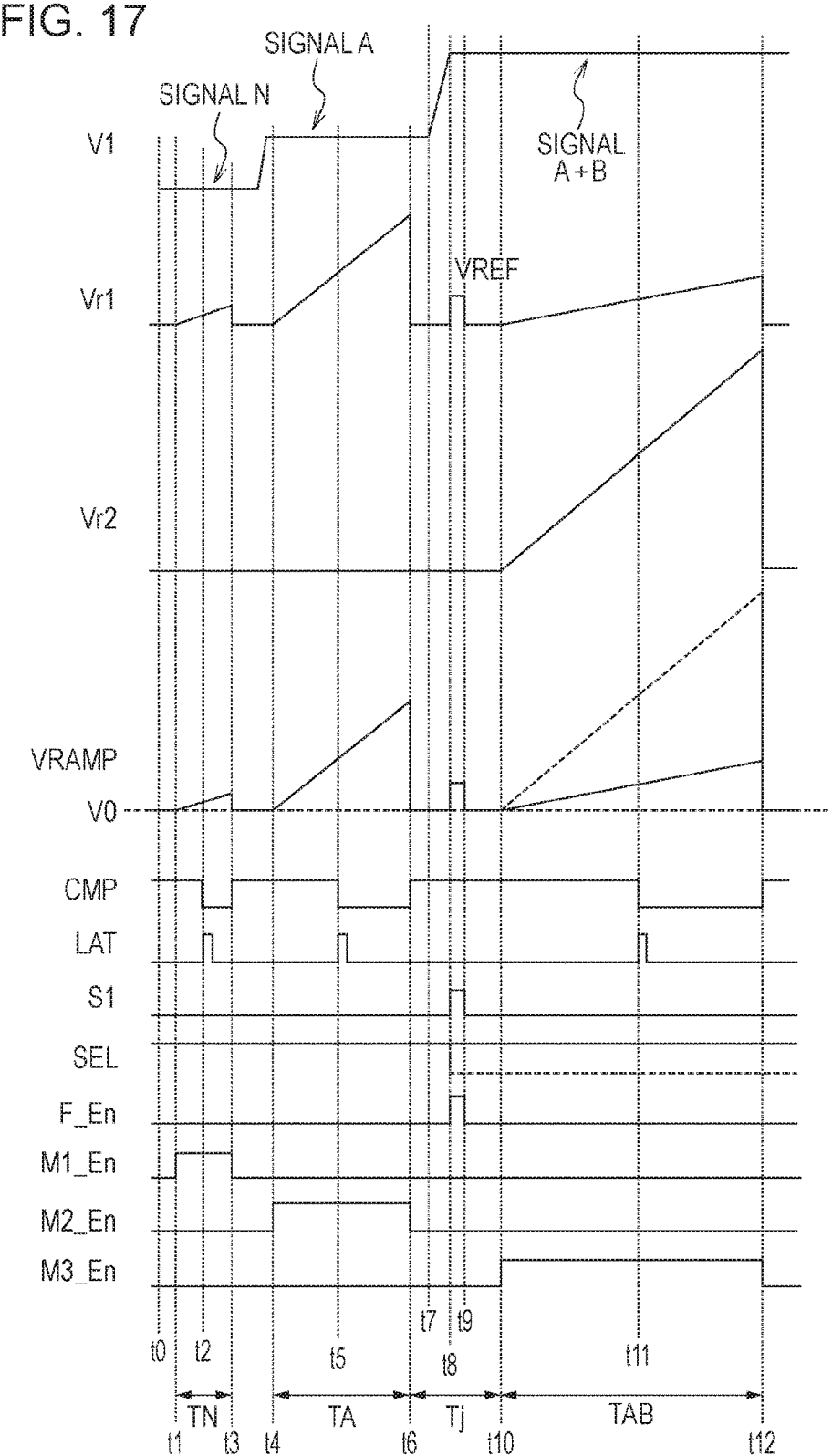
FIG. 17 is a diagram illustrating operation timing of the imaging apparatus according to another embodiment.

The signal processing circuit 101 in each column is provisioned corresponding to each column of the pixels 100 for the imaging apparatus illustrated in FIG. 16. FIG. 17 is a diagram illustrating an example of the operation of the imaging apparatus illustrated in FIG. 16. The operations illustrated in FIG. 17 compare the signal A+B and the ramp signal Vr2 when the signal A+B for the A+B conversion is over ¼ of the maximum valid signal value for the signal A+B. In contrast, the signal A+B and the ramp signal Vr1 are compared when the signal A+B for the A+B conversion is at or under ¼ of the maximum valid signal value for the signal A+B.

V1 in FIG. 17 indicates a signal that the operational amplifier 8 outputs. Each of the Vr1 and Vr2 is a ramp signal that the ramp signal supply circuit 10 outputs. The ramp signal Vr1 includes a ramp signal of which the potential is changed with first amount of change per unit of time, a ramp signal of which the potential is changed with second amount of change greater than the first amount of change, and threshold voltage VREF to be compared for determining a signal level. Also, the ramp signal Vr2 includes a ramp signal of which the potential is changed with the second amount of change.

The ramp signal VRAMP is either the ramp signal Vr1 or Vr2 selected by the selection circuit 302 and output to the comparator 9. The reference voltage at the start of the operation that changes the potential of both the ramp signal Vr1 and Vr2 is a voltage value V0.

The comparison result signal CMP is the signal representing the result of a V1 and the signal VRAMP compared by the comparator 9. A signal S1 controls the electroconductance of the switch 303, and when at H level, the switch 303 is in an electroconductive state. When the signal F_En is at H level, the flag memory 501 holds the comparison result signal CMP. When the signal M1_En is at H level, the first memory 502 holds the count signal when the signal value of the comparison result signal CMP is changed. When the signal M2_En is at H level, the second memory 503 holds the count signal when the signal value of the comparison result signal CMP is changed. When the signal M3_En is at H level, the third memory 504 holds the count signal when the signal value of the comparison result signal CMP is changed.

At point-in-time t0, the comparison result signal CMP changes to H level, and the signal S1, and signals F_En, M1_En, M2_En, and M3_En change to L level. The signal N is output from the pixel 100. The operational amplifier 8 amplifies the signal N, and outputs this to the comparator 9.

At point-in-time t1, the ramp signal supply circuit 10 starts to change the potential that depends on the time of the ramp signal Vr1. The input of the selection circuit 302 is at H level when the switch 303 is off, and selects the ramp signal Vr1 from among two ramp signals Vr1 and Vr2, and outputs this to the comparator 9 until the determination of the signal level at point-in-time t7. Also, the signal M2_En changes to H level.

At point-in-time t2, the magnitude relationship of the signal output from the operational amplifier 8 and the ramp signal VRAMP is reversed, and the signal value of the comparison result signal CMP changes to L level. The first memory 502 holds the count signal per the signal LAT at this time. This count signal is the digital signal N.

At point-in-time t3, the ramp signal supply circuit 10 stops changing the potential that depends on the time of the ramp signal Vr1, and the potential of the ramp signal Vr1 changes to the potential V0 at the time of the point-in-time t3. Also, the TG 110 changes the signal M1_En to L level.

At a timing before point-in-time t4, the pixel 100 outputs the signal A. The operational amplifier 8 amplifies the signal A, and outputs this to the comparator 9. The ramp signal supply circuit 10 starts to change the potential that depends on the time of the ramp signal Vr1. The selection circuit 302 outputs the ramp signal Vr1 from among the two ramp signals Vr1 and Vr2 to the comparator 9 when the signal SEL is at L level. Also, the signal M2_En changes to H level.

At point-in-time t5, the magnitude relationship of the signal output from the operational amplifier 8 and the ramp signal VRAMP is reversed, and the signal value of the comparison result signal CMP changes to L level. The second memory 503 holds the count signal at this time. This count signal is the digital signal A. At point-in-time t6, the ramp signal supply circuit 10 stops changing the potential that depends on the time of the ramp signal Vr1, and the potential of the ramp signal Vr1 changes to the potential V0 at the time of the point-in-time t3. Also, the TG 110 changes the signal M2_En to L level.

At point-in-time t7, the pixel 100 outputs the signal A+B. The operational amplifier 8 amplifies the signal A+B, and outputs this to the comparator 9. At point-in-time t8, the ramp signal supply circuit 10 changes the potential of the ramp signal Vr1 to a threshold signal VREF. The potential of the threshold signal VREF is lower than the potential of the ramp signal Vr1 at point-in-time t12, which will be described later. When the signal output from the operational amplifier 8 is larger than the threshold signal VREF, the comparator 9 outputs the comparison result signal CMP that is at level. Conversely, when the threshold signal VREF is larger than the signal output from the operational amplifier 8, the comparator 9 outputs the signal as it is, which is at H level. Here, the embodiment is described in which the threshold signal VREF is smaller than the signal A+B, and the signal value of the comparison result signal CMP output from the comparator 9 is at H level for the point-in-time t8. Also, the TG 110 changes the signal S1 to H level. As a result, the comparison result signal CMP at the H level of the point-in-time t8 is output to the selection circuit 302. Further, the signal value of the signal SEL when the signal A+B is larger than the threshold signal VREF is illustrated in FIG. 17 as a dashed line.

The relationship between the operation of the selection circuit 302 and the signal value of the comparison result signal CMP between the point-in-time t8 and point-in-time t9 will now be described. When the comparison result signal CMP is at H level during the period from the point-in-time t8 to the point-in-time t9, the selection circuit 302 outputs the ramp signal Vr1 to the comparator 9 for the A+B conversion. Similarly, when the comparison result signal CMP is at L level, the selection circuit 302 supplies the ramp signal Vr2 to the comparator 9 for the A+B conversion.

Also, at the point-in-time t8, the TG110 changes the signal F_En to H level. As a result, the flag memory 501 holds the comparison result signal CMP of the point-in-time t7. At the point-in-time t9, the TG 110 changes the signal F_En to L level. At point-in-time t10, the ramp signal supply circuit 10 starts to change the potential that depends on the time of the ramp signals Vr1 and Vr2. The potential change amount of the ramp signal Vr1 per unit of time for the A+B conversion is ¼ of the potential change amount for the ramp signal Vr1 per unit of time for the A conversion. Also, the potential change amount of the ramp signal Vr1 per unit of time for the A+B conversion is equal to the potential change amount for the ramp signal Vr1 per unit of time for the N conversion.

When the ramp signal Vr2 of all columns is output to the comparator 9, the ramp signal supply circuit 10 may not start to change the potential of the ramp signal Vr1. In such a case, the amount of consumer power that would have been used to change the potential of the ramp signal Vr1 may be saved. The selection circuit 302 outputs the ramp signal Vr1 to the comparator 9, based on the comparison result signal CMP at H level. The TG 110 changes the signal M3_En to H level.

At point-in-time t11, the magnitude relationship of the signal output from the operational amplifier 8 and the ramp signal VRAMP is reversed, and the signal value of the comparison result signal CMP changes to L level. The third memory 504 holds the count signal at this time. This count signal is the digital signal A+B. At point-in-time t12, the ramp signal supply circuit 10 stops changing the potential that depends on the time of the ramp signals Vr1 and Vr2. The TG 110 changes the signal M3_En to L level. After a point-in-time T11, the horizontal scanning circuit 14 consecutively scans the memory 13 in each column, and outputs each digital signal held in the flag memory 501, the first memory 502, the second memory 503, and the third memory 504 of each column to the DSP 80.

Figure 18:
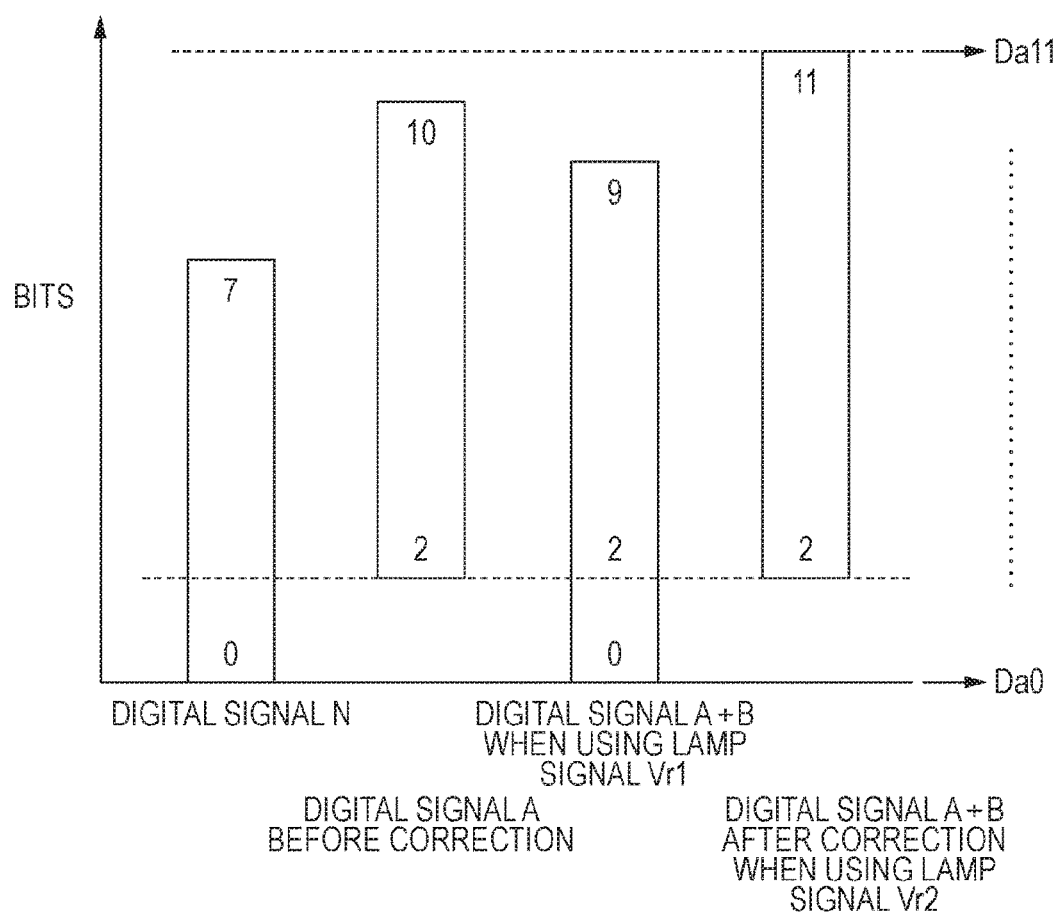
FIG. 18 is a diagram illustrating an example of digital signal correction according to another embodiment.

Next, the generated digital signal N, the digital signal A, and the digital signal A+B will be described with reference to FIG. 18. According to the present embodiment, the digital signal N is an 8-bit digital signal that includes the data bits from the 0 bit to the seventh bit. The potential change amount per unit of time of the ramp signal Vr1 used in the A conversion is 4 times the potential change amount per unit of time of the ramp signal Vr1 used in the N conversion, and so the memory 13 performs a correction to bit shift each bit of the digital signal A up two bits. The digital signal A after correction is a 9-bit digital signal with valid bits from the second bit to the tenth bit. The digital signal A+B generated using the ramp signal Vr1 is a 10-bit digital signal that includes the data bits from the 0 bit to the ninth bit. When the digital signal A+B is generated using the ramp signal Vr2, the memory 13 performs a correction to bit shift each bit of the digital signal A+B by two bits. The digital signal A+B after correction is a 10-bit digital signal with valid bits from the second bit to the eleventh bit.

When the signal amplitude of the signal A+B is small due to the operations described for this embodiment, the resolution of the AD conversion of the signal A+B may be higher than that for signal A by decreasing the potential change amount of the ramp signal VRAMP per unit of time. In other words, the signal value of the signal A+B may be made smaller by one LSB of the digital signal A+B. As a result, images with little gradation loss may be obtained by increasing the resolution of the AD conversion, even for photographs of scenes in low-light conditions.

The imaging apparatus of the present embodiment may change the resolution of the AD conversion depending on the signal amplitude of the signal A+B. As a result, when the signal amplitude of the signal A+B is large, the AD conversion is quickly performed, and when the signal amplitude of the signal A+B is small, the AD conversion is performed while increasing the resolution, and so both an improvement in speed and AD conversion resolution may be more readily accomplished. The switching between the ramp signals Vr1 and Vr2 is based on the comparison of the threshold signal VREF and the signal A+B. For this reason, when using the ramp signal Vr1 for the A+B conversion, the changing of the potential of the ramp signal Vr2 that depends on the time that is the same as the point-in-time t12 may be terminated. When using the ramp signal Vr1 for the A+B conversion without comparing this threshold signal VREF and the signal A+B, the potential should be changed to the signal amplitude of the ramp signal Vr2, and so a period 4 times the period TAB illustrated in FIG. 17 is desirable. Therefore, according to the imaging apparatus in the present embodiment, when a period Tj to compare the threshold signal VREF and the signal A+B is added, the AD conversion period may still be made shorter as compared to a case when the potential of the ramp signal Vr1 is changed to the same amplitude as the ramp signal Vr2.

According to the present embodiment, the changing of the potential of the ramp signal Vr1 is terminated at the point-in-time t12, which is also when the ramp signal Vr2 is terminated. The changing of the potential of the ramp signal Vr1 does not have to be terminated at the point-in-time t12, changing of the potential may be terminated later than that for the ramp signal Vr2. In order to implement such a mode, the digital signal A+B generated with the ramp signal Vr1 should be a 10-bit digital signal with one redundancy bit.

Eighth Embodiment

The description of the present embodiment will focus on the differences as to the seventh embodiment. The imaging apparatus of the present embodiment changes the potential change amount of the ramp signal VRAMP per unit of time for the A conversion corresponding to the operations described in FIG. 17 regarding the seventh embodiment.

Figure 19:
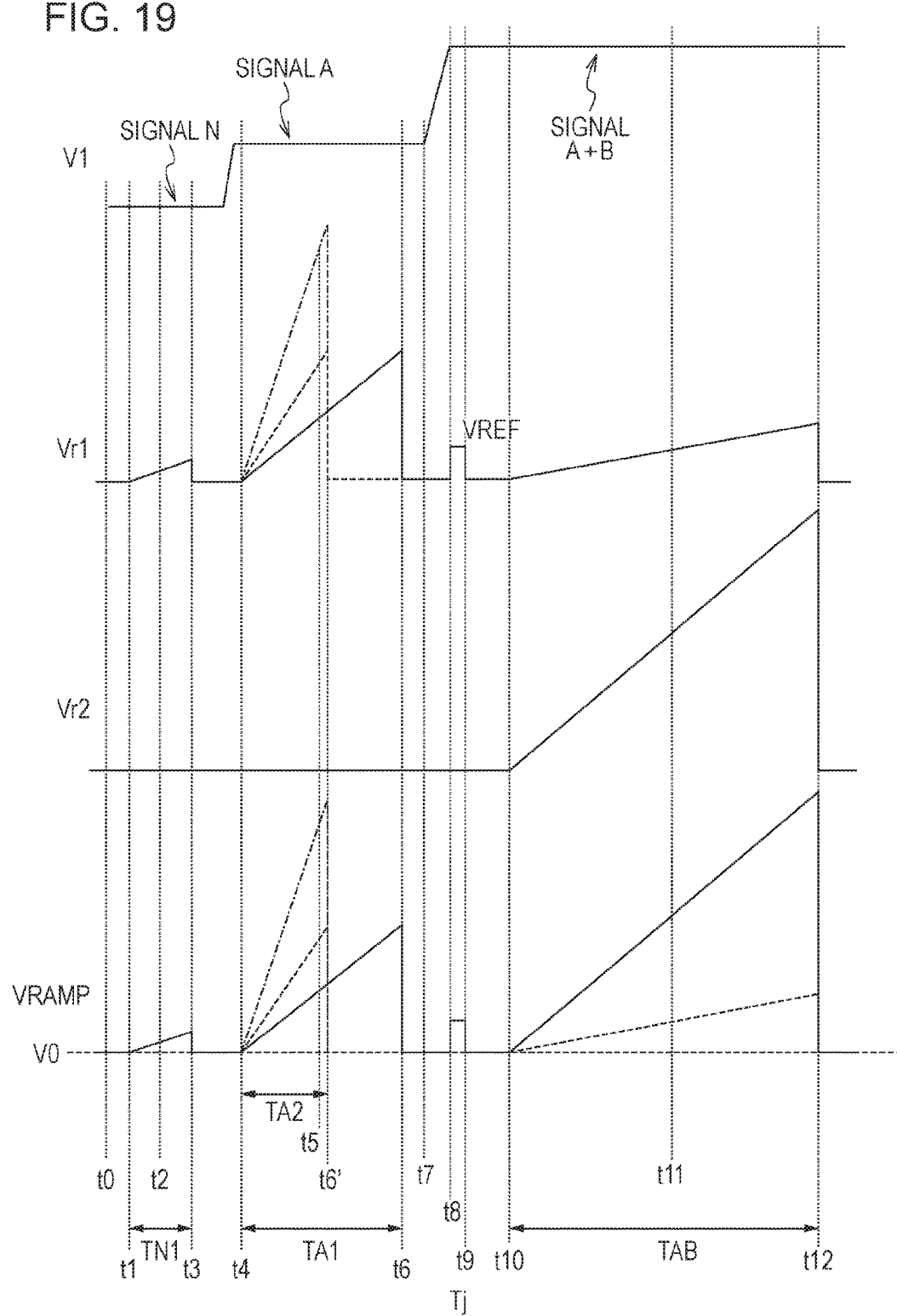
FIG. 19 is a diagram illustrating operation timing of the imaging apparatus according to another embodiment.

FIG. 19 is a diagram illustrating the waveform of the ramp signal Vr1 for the A conversion of the seventh embodiment as a solid line. Also, FIG. 19 illustrates the dashed line waveform that is two times the solid line waveform representing the potential range amount of the ramp signal Vr1 for the A conversion per unit of time, and the alternating dashed line waveform that is 4 times the solid line waveform representing the potential range amount of the ramp signal Vr1 for the A conversion per unit of time. When the signal A is used as the focal-point detection signal, the potential change amount of the ramp signal VRAMP for the A conversion per unit of time is determined depending on the resolution of the desired signal A. Also, the operations of the present embodiment may be particularly applicable when making the resolution of the AD conversion of focal-point detection signals lower than that of signals for image obtaining signals.

A period TA2 where the A conversion is performed in the present embodiment is one-half the time of the period TA1 where the A conversion is performed in the seventh embodiment. The correction of the digital signal A by changing the potential change amount of the ramp signal VRAMP for the A conversion per unit of time may be performed with a bit shift in the same way as described in the sixth embodiment and the seventh embodiment.

The clock frequency that drives the counter circuit 11 or the counter circuit 110 has been the same for the N conversion, the A conversion, and the A+B conversion regarding the fifth embodiment, the sixth embodiment, the seventh embodiment, and the eighth embodiment. Besides changing the potential change amount of the ramp signal VRAMP per unit of time as previously described, the clock frequency that drives the counter circuit may also be used as the method to control the resolution of the AD conversion. Specifically, when decreasing the resolution of the AD conversion, the count signal is generated for a first count amount per unit of time for the A+B conversion. Also, the count signal is generated for a second count amount per unit of time that is smaller than the first count amount for the A conversion. As a result, the resolution for the A conversion is lower than that for the A+B conversion. In such a case, the power consumed by the counter circuit may be decreased.

Ninth Embodiment

Figure 20:
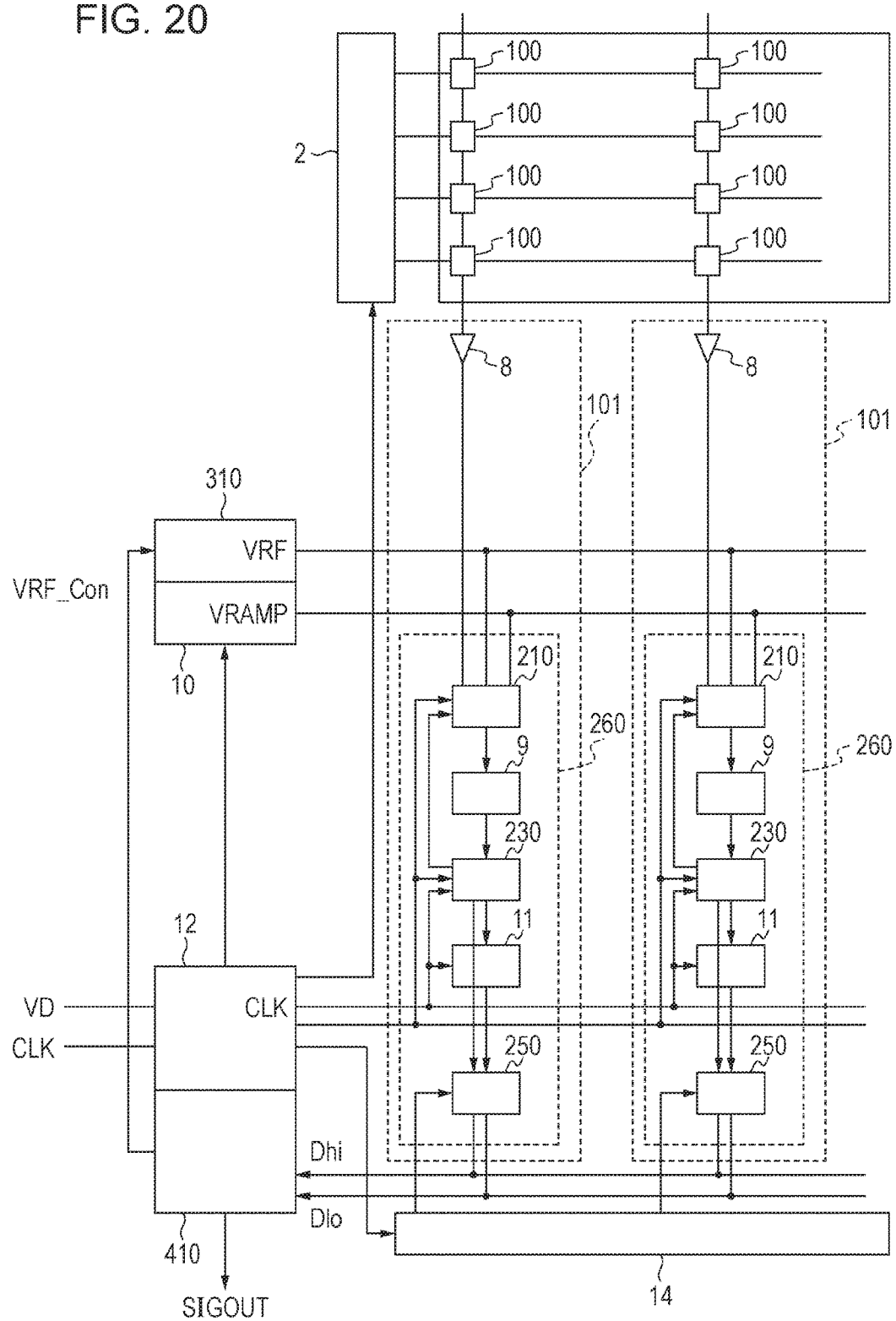
FIG. 20 is an equivalent circuit diagram of the imaging apparatus according to another embodiment.

An imaging apparatus that includes an AD conversion unit that operates as a sequential comparison type of AD conversion circuit and a ramp type of AD conversion circuit will be described for the present embodiment. The ramp type of AD conversion circuit is in reference to a type of AD conversion circuit in which a signal is compared to a ramping voltage. FIG. 20 is a schematic diagram illustrating an example configuration of the imaging apparatus in the present embodiment. The portions of the configuration that include the same functions as those in FIG. 3 are denoted with the same reference numerals in FIG. 20 as those used in FIG. 3. The pixel signal supplied to the operational amplifier 8 is amplified based on the gain of the operational amplifier 8, and then output to a comparison input unit 210. This signal output by the operational amplifier 8 is referred to as an amplified pixel signal. A signal VRF from a signal supply circuit 310 and the ramp signal VRAMP from the ramp signal supply circuit 10 are supplied to the comparison interface unit 210 in each column. The reference signals according to the present embodiment are the signal VRF and ramp signal VRAMP. The reference signal supply units according to the present embodiment are the signal supply unit 310 and ramp signal supply circuit 10. The comparator 9 outputs the comparison result signal CMP based on the result of comparing the signal based on the signal VRF and the amplified pixel signal. An AD conversion unit 260 generates a digital signal Dhi with the highest number of m bits from among the N bits, based on the comparison result signal CMP. Further, the comparator 9 outputs the comparison result signal CMP based on the comparison of the ramp signal VRAMP and the signal based on the amplified pixel signal. The AD conversion unit 260 generates a digital signal D1o with the lowest number of n bits from among the N bits based on the comparison result signal CMP. Here, the reference letters N, m, and n form the expression N=m+n.

A control circuit 230 operates the comparison input unit 210, the counter circuit 11, and memory 250, based on the signal from the TG 12 and the comparator 9. The clock signal CLK is supplied from the TG 12 to the counter circuit 11. The control circuit 230 starts counting of the clock signal CLK in the counter circuit 11, based on starting of the change in potential that depends on the time of the ramp signal VRAMP by the ramp signal supply circuit 10. The control circuit 230 holds the digital signal Dhi and the digital signal D1o in the memory 250. The AD conversion unit 260 includes the comparison interface unit 210, the comparator 9, the control circuit 230, the counter circuit 11, and the memory 250.

Based on the signal from the TG 12, the horizontal scanning circuit 14 consecutively transfers each digital signal Dhi and digital signal D1o held in the memory 250 in each column to a digital signal processing circuit 410. The digital signal processing circuit 410 outputs an imaging signal SIGOUT based on the digital signal Dhi and the digital signal D1o. The clock signal CLK and a scanning synchronization signal VD are supplied to the TG 12. Based on the vertical synchronizing signal VD, the TG 12 causes the vertical scanning circuit 2 to scan each row of the pixels 100.

Figure 21A:
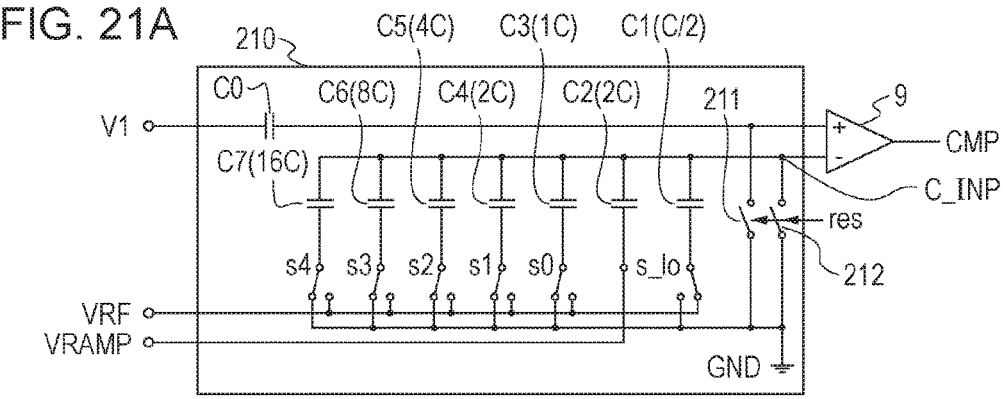
FIG. 21A is an equivalent circuit diagram of the AD conversion unit according to another embodiment.

FIG. 21A is a diagram illustrating an example configuration of the comparison input unit 210 and the comparator 9. An output V1 from the operational amplifier 8 is supplied to a non-inverted input node of the comparator 9 via a capacitor element C0. Also, another node of the capacitor element C0 is reset to the ground potential when a switch 211 is electroconductive. This was reset to the ground potential here for ease of explanation, but this may be reset to a potential within the input range of the comparator 9. Also, one node of each of multiple capacitor elements C1, C2, C3, C4, C5, C6, and C7 are juxtaposed and electrically connected to the non-inverted input node of the comparator 9. Also, another node of the multiple capacitor elements C1, C2, C3, C4, C5, C6, and C7 is each electrically connected to the non-inverted input node of the comparator 9 via a switch s_1o, s0, s1, s2, s3, s4, and a switch 212. The signal supplied to the non-inverted input node of the comparator 9 is referred to as a comparison signal C_INP.

Also, the signal VRF is supplied to the switches s_1o, s0, s1, s2, s3, and s4. The ramp signal VRAMP is supplied to another node of the capacitor element C2. If the capacitance of the capacitor element C3 is set to 1 C, then the capacitance of the capacitor elements C4, C5, C6, and C7 are 2 C, 4 C, 8 C, and 16 C respectively. Also, the capacitance of the capacitor elements C1 and C2 is C/2 and 2 C respectively. The capacitance of each capacitor element is illustrated in FIG. 21A within parentheses. Switches 211 and 212 become electroconductive when a reset signal res is changed to H level. Also, when the control signal supplied to the switches s_1o, s0, s1, s2, s3, and s4 is at H level, the signal VRF is supplied to the capacitor elements. In contrast, when the control signal supplied to the switches s_1o, s0, s1, s2, s3, and s4 is at L level, ground potential is given to the capacitor elements. When the switch 212 is electroconductive, the potential of the capacitor elements C1, C3, C4, C5, C6, and C7 is reset. The comparison input unit 210 is the comparison signal supply circuit.

Figure 21B:
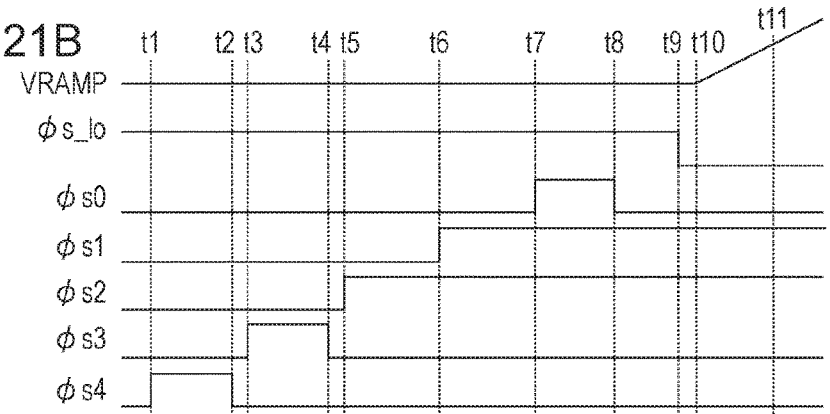
FIG. 21B is a diagram illustrating the dynamic range of the imaging apparatus according to another embodiment.
Figure 21C:
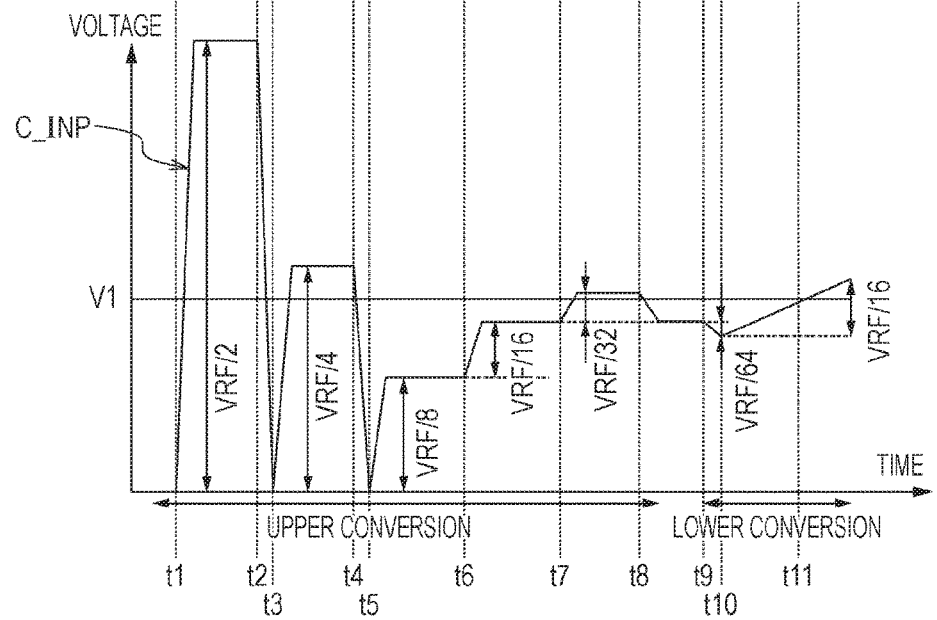
FIG. 21C is a diagram illustrating the dynamic range of the imaging apparatus according to another embodiment.

Next, the operations to convert the amplified pixel signals based on the pixel signal output from the pixel 100 into digital signals using the comparison input unit 210 and the comparator 9 illustrated in FIG. 21A will be described with reference to FIG. 21B and FIG. 21C. FIG. 21B is a diagram illustrating the potential of control signals φs_1o, φs0, φs1, φs2, φs3, φs4, and the ramp signal VRAMP supplied to the switches s_1o, s0, s1, s2, s3, and s4. FIG. 21C is a diagram illustrating the potential of the output V1 from the operational amplifier 8 and the potential of the comparison signal C_INP.

Point-in-time t1 through t11 illustrated in FIG. 21B correspond to the same point-in-time t1 through t11 illustrated in FIG. 21C. Before the point-in-time t1, the reset signal res is changed to H level, and one node of the capacitor elements C0 and C2 are reset. Also, the charge in the capacitor elements C1, and C3 through C7 are reset. Next, after the reset signal res is changed to L level, the amplified pixel signal is supplied to the non-inverted input node of the comparator 9 via the capacitor element C0.

At the point-in-time t1, the control signal φs4 is changed to H level. The other control signals φs_1o, φs0, φs1, φs2, and φs3 are at L level. Also, the ramp signal VRAMP is at a ramp start potential rmp_st. By changing the control signal φs4 to H level, the potential of the comparison signal C_INP changes to VRF/2 (The potential only changes to 15/33.5, which is the ratio of the capacitance of the capacitor element C7 against the summation capacitance 33.5 C of the capacitor element electrically connected to the inverted node of the comparator 9 per the circuit diagram, but this has been expressed as VRF/2 to simplify the description. In actual circuits, there is some signal attenuation due to parasitic capacitance, but the capacitance of the capacitor element C1 may be set so that binary comparison accomplished.). The comparator 9 outputs a comparison result signal with a signal value of 0 to the control circuit 230, as the potential of the comparison signal C_INP is larger than the output V1 from the operational amplifier 8.

At the point-in-time t2, the control circuit 230 changes the control signal φs4 to L level, and at the point-in-time t3, changes the control signal φs3 to H level. As a result, the potential of the comparison signal C_INP changes to VRF/4. The comparator 9 outputs the comparison result signal with a signal value of 0 to the control circuit 230, as the comparison signal C_INP is larger than the output V1 from the operational amplifier 8.

At the point-in-time t4, the control circuit 230 changes the control signal φs3 to L level, and at the point-in-time t5, changes the control signal φs2 to H level. As a result, the potential of the comparison signal C_INP changes to VRF/8. The comparator 9 outputs the comparison result signal with a signal value of 1 to the control circuit 230, as the output V1 from the operational amplifier 8 is larger than the comparison signal C_INP.

At the point-in-time t6, the control circuit 230 leaves the control signal φs2 at H level, and changes the control signal φs1 to H level. As a result, the potential of the comparison signal C_INP rises to VRF/16 from the potential at the point-in-time t5. The comparator 9 outputs the comparison result signal with a signal value of 1 to the control circuit 230, as the output V1 from the operational amplifier 8 is larger than the comparison signal C_INP.

At the point-in-time t7, the control circuit 230 leaves the control signal φs1 at H level, and changes the control signal φs0 to H level. As a result, the potential of the comparison signal C_INP rises to VRF/32 from the potential at the point-in-time t6. This VRF/32 which represents the range of fluctuation for the potential of the comparison signal C_INP, is the potential difference that changes to obtain the lowest bit signal from the high bits. The comparator 9 outputs the comparison result signal with a signal value of 0 to the control circuit 230, as the comparison signal C_INP is larger than the output V1 from the operational amplifier 8. As a result, the signal value for the 5 high bits of the digital signal that results from the AD conversion of the output V1 from the operational amplifier 8 is 00110. This operation to obtain the signal value for the 5 high bits is the high bit obtaining operation.

At the point-in-time t8, the control circuit 230 changes the control signal φs0 to L level. As a result, the potential of the comparison signal C_INP changes to the potential at the point-in-time t7. Further, at the point-in-time t9, the control circuit 230 changes the control signal φs_1o to L level. As a result, the potential of comparison signal C_INP reduces to VRF/64 from the potential at the point-in-time t8.

Also, at the point-in-time t10, the ramp signal supply circuit 10 starts changing the potential that depends on the time of the ramp signal VRAMP. Also, the counter circuit 11 starts counting of the clock signal CLK based on this starting of the change to the potential of the ramp signal VRAMP.

At the point-in-time t11, the magnitude relationship of the comparison signal C_INP and the output V1 from the operational amplifier 8 is reversed. In other words, the signal value of the comparison result signal output from the comparator 9 changes from 1 to 0. At this time, the counter circuit 11 holds a count signal CNT that represents the counted clock signal CLK. This count signal CNT is an 8-bit digital signal. The operation to obtain the signal value of these 8 low bits is the low bit obtaining operation. A 13-bit AD conversion may be performed by adding the high 5 bits and the 8 low bits regarding the output V1 from the operational amplifier 8 via the high bit obtaining operation and the low bit obtaining operation. The reference signals of the present embodiment are the signal VRF and the ramp signal VRAMP. Thus, according to the mode in FIG. 21C, the period to compare the signal output from the pixel and the reference signal is the period where the high bit obtaining operation and the low bit obtaining operation are performed.

An example of the operation of the imaging apparatus in FIG. 20 that includes the pixels 100 illustrated in FIG. 1 will be described using FIG. 22A. First, the N conversion generates an 8-bit digital signal by only performing the AD conversion on the low 8 bits without performing the AD conversion on the high 5 bits. Next, the A conversion generates a 12-bit digital signal by performing the AD conversion on 4 bits of the high 5 bits after removing the MSB (s4), which is the highest bit, and on the low 8 bits. Also, the A+B conversion generates a 13-bit digital A+B signal adding the high 5 bits and the low 8 bits.

According to the present embodiment, the resolution of the AD conversion for the A conversion and the A+B conversion are the same, but the maximum signal value of the digital signal A is one-half the maximum value of the digital signal A+B. This may be configured such as the signal amplitude of the signal A is smaller than the signal amplitude of the signal A+B.

Figure 22A:
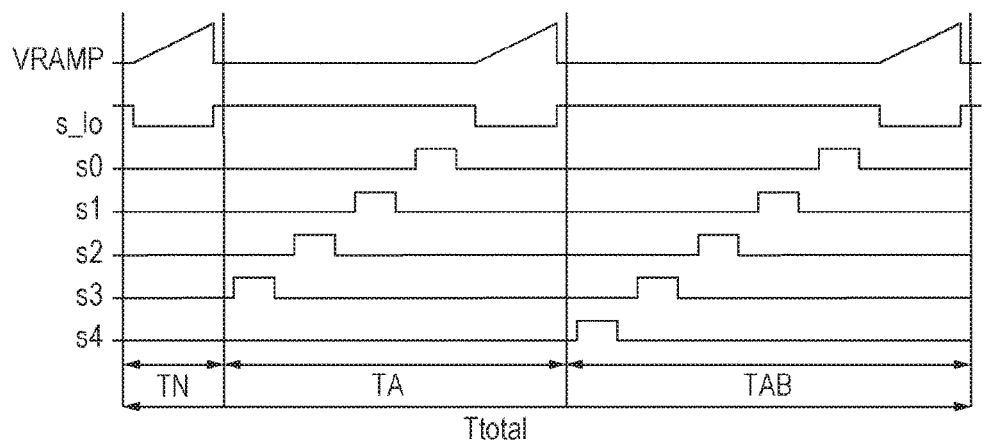
FIG. 22A is a diagram illustrating the dynamic range of the imaging apparatus according to another embodiment.

Further, to simplify the description, the example has been described in FIG. 22A wherein the control signals φs1, φs2, φs3, and φs4 used in the sequential comparison have all been changed from H level to L level. However, as described with reference to FIG. 21B and FIG. 21C, this may be controlled based on the signal value of the comparison result signal CMP from the comparator 9, which is dependent on the signal value of the output V1 from the operational amplifier 8.

Tenth Embodiment

Figure 22B:
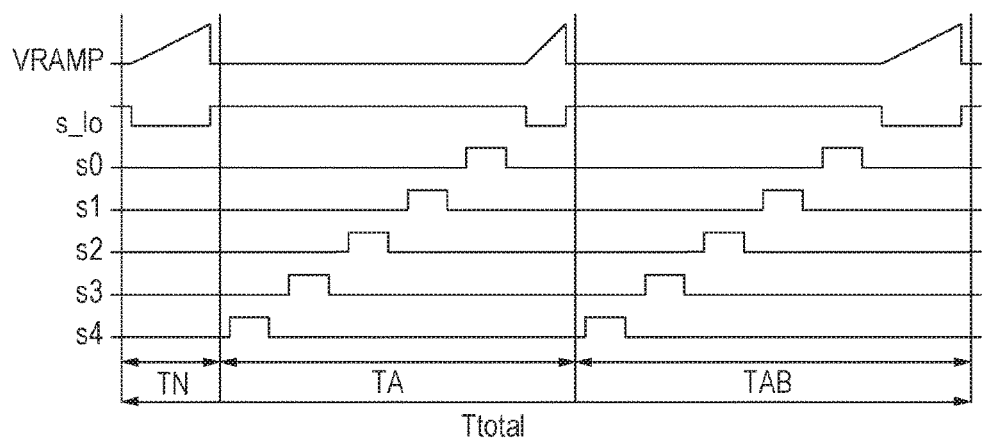
FIG. 22B is a diagram illustrating the dynamic range of the imaging apparatus according to another embodiment.

The description of the present embodiment will focus on the differences as to the ninth embodiment. The operations for the conversion A regarding the present embodiment is different from the ninth embodiment. FIG. 22B is a diagram illustrating an example of the AD conversion operations of the present embodiment. The operation illustrated in FIG. 22B makes the potential change amount of the ramp signal VRAMP per unit of time for the A conversion two times the ramp signal VRAMP of the A+B conversion, and decreases the period to change the potential by one-half. The count frequency of the counter circuit 11 is the same for both the A conversion and the A+B conversion. As a result, the low bits for the A conversion are 7 bits. Also, the high bits for the A conversion in the ninth embodiment was 4 bits, but there are 5 high bits in the present embodiment. Therefore, the A conversion generates a 12-bit digital signal by adding the high 5 bits and the low 7 bits.

According to the present embodiment, the period to change the potential of the ramp signal VRAMP for the A conversion is shorter than that for the A+B conversion. The high bit AD conversion period is the same length of time for both the A conversion and the A+B conversion. As a result, the period for the A conversion is shorter than the period for the A+B conversion. Therefore, the period Ttotal to convert the pixel signals of the present embodiment into digital signals may shortened as compared to a case when the period for the A conversion and the period for the A+B conversion take the same amount of time.

Also, the correction of the low bits of the digital signal A, which is the result of changing the potential change amount of the ramp signal VRAMP per unit of time, may be performed by bit shifting in the same way as described in the sixth embodiment, the seventh embodiment, and the eighth embodiment.

Eleventh Embodiment

Figure 22C:
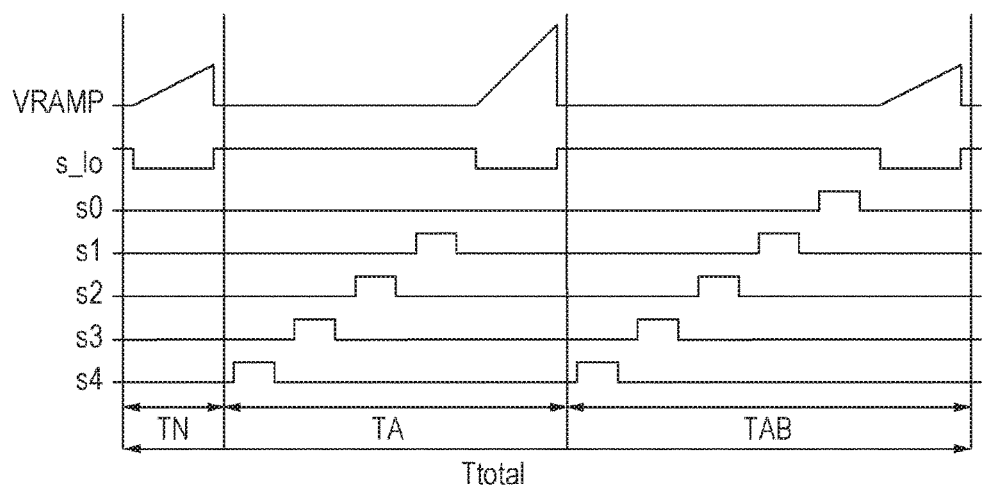
FIG. 22C is a diagram illustrating the dynamic range of the imaging apparatus according to another embodiment.

The description of the present embodiment will focus on the differences as to the ninth embodiment. FIG. 22C is a diagram illustrating an example of the operations of the imaging apparatus in the present embodiment. In the ninth embodiment, the A conversion was obtained by the high bit AD conversion of 4 bits in which the MSB, or the highest bit, was removed from the 5 high bits. According to the present embodiment, the A conversion is obtained by a high bit AD conversion of 4 bits in which the lowest bit is removed from the 5 high bits. Also, the potential change amount of the ramp signal VRAMP per unit of time for the A conversion is increased two times the ramp signal VRAMP of the A+B conversion, and the amplitude to change the potential is increased two times. The count frequency of the counter circuit 11 is the same for both the A conversion and the A+B conversion. Therefore, the digital signal A is a 12-bit signal as the total of the 4 high bits and 8 low bits.

According to the imaging apparatus of the present embodiment, the high bit AD conversion period for the A conversion is shorter than that for the A+B period. Therefore, the period Ttotal to convert the pixel signals of the present embodiment into digital signals may shortened as compared to a case when the period for the A conversion and the period for the A+B conversion take the same amount of time.

Also, the correction of the low bits of the digital signal A, which is the result of changing the potential change amount of the ramp signal VRAMP per unit of time, may be performed by bit shifting in the same way as described in the sixth embodiment, the seventh embodiment, the eighth embodiment, and the tenth embodiment.

The AD conversion unit of the ninth embodiment, the tenth embodiment, and the eleventh embodiment uses a sequential comparison type of AD conversion circuit for the high bit obtaining operation, and a ramp type of AD conversion circuit for the low bit obtaining operation. The ramp type of AD conversion circuit is in reference to a type of AD conversion circuit in which a signal is compared to a varying reference signal such as ramp signal VRAMP. Not limited to this embodiment, the AD conversion unit may use a ramp type of AD conversion circuit for the high bit obtaining operation, and a sequential comparison type of AD conversion for the low bit obtaining operation. In such a mode, at least either the high bit count or the low bit count, or both, of the digital signal A should be smaller than that of the digital signal A+B. As a result, the period for the A conversion may be shorter than the period for the A+B conversion.

Twelfth Embodiment

Figure 23A:
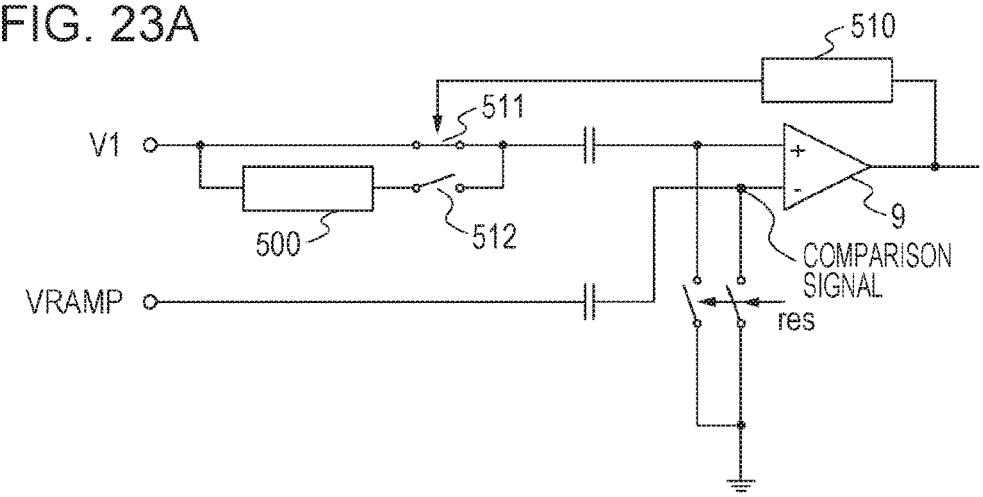
FIG. 23A is an equivalent circuit diagram of the imaging apparatus according to another embodiment.

The present embodiment changes the potential change amount of the ramp signal VRAMP per unit of time depending on the signal level of the pixel signal. FIG. 23A is a diagram illustrating an example of the electrical pathway from the operational amplifier 8 to the comparator 9 of the present embodiment.

According to the configuration illustrated in FIG. 23A, the output V1 from the operational amplifier 8 is supplied to the comparator 9 either via an attenuator 500 and a capacitor element, or via just the capacitor element without the attenuator 500. When the output V1 from the operational amplifier 8 is supplied to the comparator 9, either the switch 511 or the switch 512 should be electroconductive, or a determination circuit 510 should select the signal. The attenuator 500 attenuates the output V1 from the operational amplifier 8 by ¼. As the attenuator 500 attenuates the output V1 from the operational amplifier 8, this serves to lower the amplification ratio of the pixel signal output to the comparator 9. The amplifier unit of the present embodiment includes the operational amplifier 8 and the attenuator 500.

The operation of the configuration illustrated in FIG. 23A will be described with reference to FIG. 23B. The solid line and the dashed line for the output V1 from the operational amplifier 8 represent the signal when the brightness of the photographic subject is different. According to the present embodiment, the potential change amount of the ramp signal VRAMP per unit of time is the same for the N conversion and the A+B conversion, but it is larger for the A conversion than for the A+B conversion.

The N conversion and the A conversion may be performed in the same was as in the sixth embodiment. Afterwards, the output V1 from the operational amplifier 8 based on the A+B signal is compared with the threshold signal VREF. At this time, the output V1 from the operational amplifier 8 is a first amplified signal amplified by the amplifier unit at a first amplification ratio. The potential of the threshold signal VREF is set to a value smaller than the amplitude to change the potential of the ramp signal VRAMP for the A conversion, with consideration given to property error for each column of the comparator 9. When the output V1 from the operational amplifier 8 is larger than the threshold signal VREF, the determination circuit 510 changes the switch 511 to a non-electroconductive state, and the switch 512 to an electroconductive state. In contrast, when the output V1 from the operational amplifier 8 is smaller than the threshold signal VREF, the determination circuit 510 maintains the electroconductive state of the switch 511, and the non-electroconductive state of the switch 512.

Figure 23B:
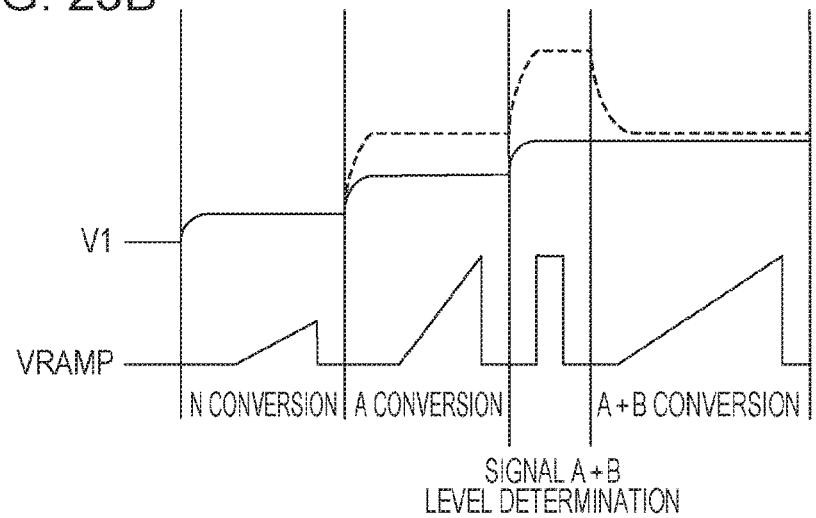
FIG. 23B is a diagram illustrating the dynamic range of the imaging apparatus according to another embodiment.

As illustrated by the dashed line in FIG. 23B, when the output V1 from the operational amplifier 8 is larger than the threshold signal VREF, the output V1 from the operational amplifier 8 is attenuated to a signal value of ¼ by the attenuator 500. That is to say, a second amplified signal amplified by the amplifier unit at a second amplification ratio smaller than the first amplification ratio is output to the comparator 9. As a result, the potential of the non-inverted input node of the comparator 9 fits within the potential change range of the ramp signal VRAMP for the A+B conversion, which is the same as for the A conversion. In contrast, when performing the A+B conversion without the attenuator 500, the potential change range of the ramp signal VRAMP for the A+B conversion has to be increased by 4 times that of the present embodiment. According to the present embodiment, the AD conversion period for the A+B conversion may be shortened as compared to a case in which the attenuator 500 has not been provisioned.

Further, when the signal has been supplied to the comparator 9 via the attenuator 500 for the A+B conversion, the digital signal A+B has to be corrected by bit shifting the signal up two bits as described previously with reference to FIG. 18.

Figure 23C:
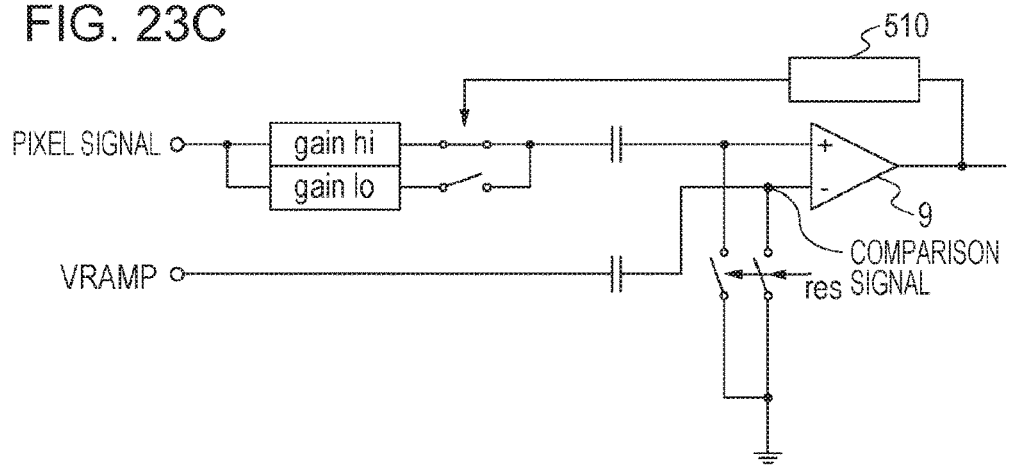
FIG. 23C is an equivalent circuit diagram of the imaging apparatus according to another embodiment.

The present embodiment has been described with the output V1 from the operational amplifier 8 being attenuated by the attenuator 500, but this is not limited to only this mode. For example, as illustrated in FIG. 23C, the amplification ratio may be switched for the electrical path from the pixel 100 to the comparator 9. As another example, the amplification ratio of the operational amplifier 8 may also be switched.

The same result as with the configuration described in FIG. 23A may be obtained with such a mode. Also, the configuration of the present embodiment may be applied to the configuration in FIG. 21A. The configuration that attenuates the signal to be supplied to the non-inverted input node of the comparator 9 as illustrated in FIG. 23A and FIG. 23C has to be electrically connected to the non-inverted input node of the comparator 9 in FIG. 22A. With such a configuration, the potential change width of the ramp signal VRAMP for the A conversion and the A+B conversion may be configured based on the signal A. As a result, the potential change width of the ramp signal VRAMP for the A conversion may be smaller than when configured based on the signal A+B. Thus, the period for the A conversion and the A+B conversion may be shortened.

Thirteenth Embodiment

Figure 24:
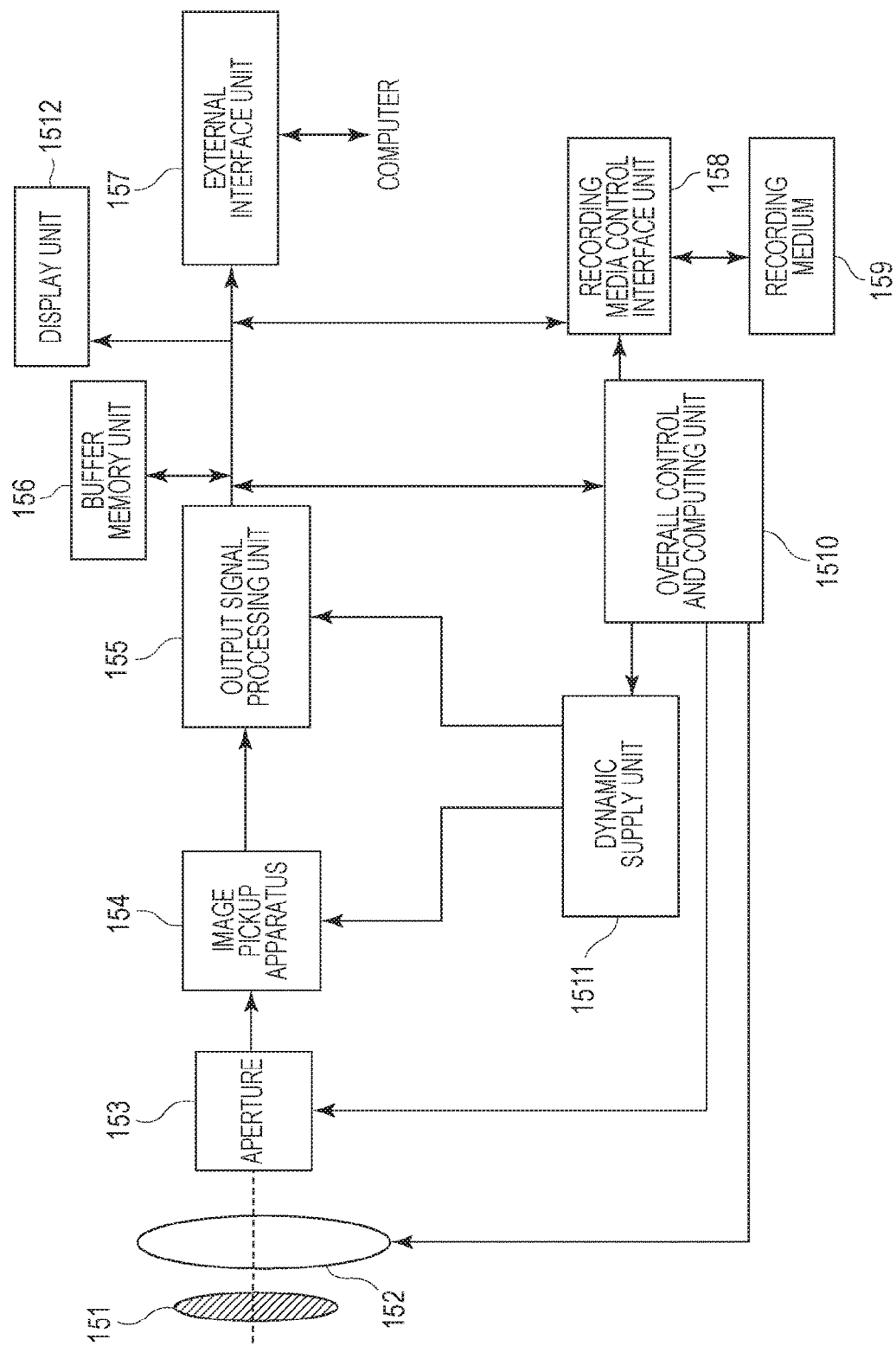
FIG. 24 is a schematic diagram of the imaging system according to another embodiment.

The present embodiment is an example of the imaging system that uses an imaging apparatus. The imaging system of the present embodiment may be configured as illustrated in FIG. 24. The imaging system of the present embodiment is different from the imaging system illustrated in FIG. 13 in that a display unit 1512 is included. The display unit 1512 displays images output from the output signal processing unit, based on control from the overall control and computing unit 1510. The present embodiment is described with the imaging apparatus 154 being operated by both a preview mode and a still image pickup mode to photograph still images. The preview mode is a mode to display images to the display unit 1512 prior to the still image pickup. The preview mode is a first mode of the present embodiment, and the imaging mode is a second mode of the present embodiment.

According to the present embodiment, the signal output by the imaging apparatus 154 is read out as different frame signals for the preview mode and the still image pickup mode, and then signal processing is performed. Image generation speed is given priority for the preview mode of the present embodiment, and so it is permissible to have image quality of images generated lower than that for the still image pickup mode. Therefore, regarding the operations illustrated in FIG. 17 and FIG. 19, the comparison of the threshold VREF and the signal A+B may be omitted, and the A+B conversion may be performed using the ramp signal Vr2. By increasing the potential change amount of the ramp signal Vr1 per unit of time for the A conversion, the period TA may be shortened even more than the mode illustrated in FIG. 5.

Also, instead of outputting the pixel signals from all pixels of the imaging apparatus 154, the pixel signals from only a portion of the pixels may be output in order to further increase the image generation speed for the preview mode of the present embodiment.

Next, the still image pickup mode will be described. The output of the focal-point detection signals from the imaging apparatus 154 may be omitted for the still image pickup mode. That is to say, the operation for the conversion A from among the operations illustrated in FIGS. 5, 14A, 15, 17, 19, 22A, 22B, 22C, and 23B may be omitted. By omitting the operation of the A conversion, the period for the A conversion and the period to output the digital signal A to the memory 13 may be omitted from the operation of one frame to pick up the still image. As a result, the period to generate one still image may be shorter than the operations illustrated in FIGS. 5, 14A, 15, 17, 19, 22A, 22B, 22C, and 23B. Also, by omitting the conversion A, the consumption power of the imaging apparatus 154 may be reduced.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. An imaging apparatus comprises:
   a pixel unit including a plurality of pixels arranged in rows, each of the plurality of pixels including a plurality of photoelectric conversion units, and being configured to output a pixel signal based on incident light;
   a microlens array including a plurality of microlenses; and
   an AD converter configured to convert the pixel signal output from each of the plurality of pixels into a digital signal,
   wherein each of the plurality of microlenses is provided for corresponding one of the plurality of pixels,
   wherein each of the plurality of microlenses is provided correspondingly to a plurality of photoelectric conversion units arranged adjacent to each other in the corresponding one of the plurality of pixels,
   wherein a period in which the AD converter performs AD conversion on a second pixel signal that is the pixel signal output by a pixel of a second row among the rows is shorter than a period in which the AD converter performs AD conversion on a first pixel signal that is the pixel signal output by a pixel of a first row among the rows, and
   wherein the AD conversion on the first pixel signal and the AD conversion on the second pixel signal are performed by the same AD converter.

2. The imaging apparatus according to claim 1, wherein the AD converter converts the pixel signal output from each of the plurality of pixels into a digital signal by comparing the pixel signal and a ramp signal.

3. The imaging apparatus according to claim 2, wherein the AD converter further comprises a comparator, and a reference signal supply unit configured to supply a reference signal to the comparator,
   wherein the reference signal supply unit is configured to supply a first reference signal and a second reference signal to the comparator, as the ramp signal,
   wherein the first reference signal is a reference signal that changes a potential during a first conversion period,
   wherein the second reference signal is a reference signal that changes a potential during a second conversion period shorter than the first conversion period, and
   wherein the comparator is configured to compare the first reference signal and the first pixel signal, and compare the second reference signal and the second pixel signal.

4. The imaging apparatus according to claim 3, wherein a change amount of the potential per unit of time is equal for the first reference signal and the second reference signal, or a change amount of the potential per unit of time of the first reference signal is larger than a change amount of the potential per unit of time of the second reference signal.

5. The imaging apparatus according to claim 1, wherein a signal range per 1 LSB of AD conversion on the second pixel signal is larger than a signal range per 1 LSB of AD conversion on the first pixel signal.

6. The imaging apparatus according to claim 2, wherein the AD converter further comprises a comparator, a reference signal supply unit configured to supply the reference signal to the comparator, a counter configured to count a clock signal, the counter being configured to generate a count signal with a first count amount per unit of time and a count signal with a second count amount per unit of time smaller than the first count amount, and a memory configured to hold the count signal,
wherein the reference signal supply unit is configured to supply a first reference signal and a second reference signal to the comparator, as the ramp signal,
wherein the first reference signal is a reference signal that changes a potential during a first conversion period to compare the first pixel signal and the reference signal,
wherein the second reference signal is a reference signal that changes a potential during a second conversion period shorter than the first conversion period,
wherein the comparator outputs a comparison result signal based on a result of comparing the reference signal and the pixel signal, and generates a first comparison result signal based on comparing the first reference signal and the first pixel signal, and the memory stores the count signal generated with the first count amount, based on the first comparison result signal, and
wherein the comparator generates a second comparison result signal based on comparing the second reference signal and the second pixel signal, and the memory stores the count signal generated with the second count amount based on the second comparison result signal.

7. The imaging apparatus according to claim 3, wherein the comparator outputs a third comparison result signal by comparing the first pixel signal and a threshold signal,
wherein when the third comparison result signal indicates that the first pixel signal is larger than the threshold signal, the comparator compares the first reference signal that changes the potential by a first change amount per unit of time and the first pixel signal, and
wherein when the third comparison result signal indicates that the first pixel signal is smaller than the threshold signal, the comparator compares the first reference signal that changes the potential by a second change amount per unit of time, which is smaller than the first change amount, and the first pixel signal.

8. The imaging apparatus according to claim 3, further comprising an amplifier,
wherein the amplifier outputs a first amplified signal which is obtained by amplifying the first pixel signal at a first amplification ratio, to the comparator,
wherein the comparator outputs a fourth comparison result signal obtained by comparing the first amplified signal and a threshold signal, and
wherein, when the fourth comparison result signal indicates that the first amplified signal is larger than the threshold signal, the amplifier outputs a second amplified signal which is obtained by amplifying the first pixel signal at a second amplification ratio smaller than the first amplification ratio, to the comparator.

9. The imaging apparatus according to claim 3, wherein a range in which the potential of the second reference signal changes depending on time is smaller than a range in which the potential of the first reference signal changes depending on time.

10. The imaging apparatus according to claim 3, wherein each of the plurality of pixels further outputs a noise signal to the comparator, and the reference signal supply unit supplies a third reference signal to the comparator, wherein the third reference signal changes the potential within a range smaller than a range in which the potential of the second reference signal changes depending on time, during a period shorter than the period in which the potential of the second reference signal changes depending on time, and
wherein the comparator compares the noise signal output from the pixel and the third reference signal.

11. The imaging apparatus according to claim 1, wherein the AD converter operates as a sequential comparison type of AD conversion circuit to determine a high bit signal value of a digital signal based on the pixel signal, and
wherein a reference signal that changes the potential depending on time is supplied to the AD converter, and the AD converter operates as a ramp type of AD conversion circuit to determine a low bit signal value of the digital signal based on the pixel signal.

12. The imaging apparatus according to claim 11, wherein regarding the digital signal generated by the AD converter operating as the sequential comparison type of AD conversion circuit, a number of bits of the digital signal based on the second pixel signal, is smaller than a number of bits of the digital signal based on the first pixel signal.

13. An imaging system comprising:
the imaging apparatus according to claim 1; and
a signal processing unit to process signals output from the imaging apparatus.

14. The imaging apparatus according to claim 1,
wherein the first pixel signal is a signal based on signal charges from m (m being an integer) photoelectric conversion units of the pixel of the first row, and
wherein the second pixel signal is a signal based on signal charges from n (n being an integer smaller than m, and equal to or larger than 1) photoelectric conversion units of the pixel of the second row.

15. The imaging apparatus according to claim 5,
wherein the first pixel signal is a signal based on signal charges from m (m being an integer) photoelectric conversion units of the pixel of the first row, and
wherein the second pixel signal is a signal based on signal charges from n (n being an integer smaller than m, and equal to or larger than 1) photoelectric conversion units of the pixel of the second row.

16. The imaging apparatus according to claim 6,
wherein the first pixel signal is a signal based on signal charges from m (m being an integer) photoelectric conversion units of the pixel of the first row, and
wherein the second pixel signal is a signal based on signal charges from n (n being an integer smaller than m, and equal to or larger than 1) photoelectric conversion units of the pixel of the second row.

17. The imaging apparatus according to claim 7,
wherein the first pixel signal is a signal based on signal charges from m (m being an integer) photoelectric conversion units of the pixel of the first row, and
wherein the second pixel signal is a signal based on signal charges from n (n being an integer smaller than m, and equal to or larger than 1) photoelectric conversion units of the pixel of the second row.

18. An imaging apparatus comprising:
a pixel including a plurality of photoelectric conversion units to generate a signal charge and to output a pixel signal based on the signal charge; and
an AD converter including a reference signal supply unit and a comparator,
wherein the reference signal supply unit supplies a first reference signal and a second reference signal that change a potential depending on time, to the comparator,
wherein the first reference signal is a reference signal that changes the potential within a first range, during a first conversion period, and the second reference signal is a reference signal that changes the potential within a second range smaller than the first range, during a second conversion period shorter than the first conversion period,
wherein the comparator outputs a comparison result signal based on comparison of the reference signal and the pixel signal,
wherein the photoelectric conversion units include a first photoelectric conversion unit and a second photoelectric conversion unit, wherein in a case where a same amount of light is input into the first photoelectric conversion unit and the second photoelectric conversion unit, a signal amplitude of a first pixel signal based on the first photoelectric conversion unit is larger than a signal amplitude of a second pixel signal based on the second photoelectric conversion unit, and
wherein the comparator compares the first reference signal and the first pixel signal, and compares the second reference signal and the second pixel signal.

19. An imaging apparatus comprising:
a first pixel and a second pixel each including a photoelectric conversion unit to generate a signal charge and to output a pixel signal based on the signal charge; and
an AD converter including a reference signal supply unit and a comparator,
wherein the reference signal supply unit supplies a first reference signal and a second reference signal that change a potential depending on time, to the comparator,
wherein the first reference signal is a reference signal that changes the potential within a first range, during a first conversion period, and the second reference signal is a reference signal that changes the potential within a second range smaller than the first range, during a second conversion period shorter than the first conversion period,
wherein the comparator outputs a comparison result signal based on comparison of the reference signal and the pixel signal,
wherein in a case where a same amount of light is input into the first pixel and the second pixel, a signal amplitude of the pixel signal output from the first pixel is larger than a signal amplitude of the pixel signal output from the second pixel, and
wherein the comparator compares the first reference signal and the pixel signal output from the first pixel, and compares the second reference signal and the pixel signal output from the second pixel.

* * * * *